United States Patent [19]
Johnston et al.

[11] Patent Number: 5,136,377
[45] Date of Patent: Aug. 4, 1992

[54] ADAPTIVE NON-LINEAR QUANTIZER

[75] Inventors: James D. Johnston, Warren; Scott C. Knauer, Mountainside; Kim N. Matthews, Watchung; Arun N. Netravali, Westfield; Eric D. Petajan, Watchung; Robert J. Safranek, New Providence; Peter H. Westerink, Newark, all of N.J.

[73] Assignee: AT&T Bell Laboratories, Murray Hill, N.J.

[21] Appl. No.: 626,279

[22] Filed: Dec. 11, 1990

[51] Int. Cl.⁵ .................. H04N 7/12; H04N 7/01; H04N 7/04
[52] U.S. Cl. ...................... 358/136; 358/140; 358/141
[58] Field of Search ............ 358/135, 136, 140, 141, 358/12

[56] References Cited

U.S. PATENT DOCUMENTS

| | | | |
|---|---|---|---|
| 4,051,530 | 9/1977 | Kuroda et al. | 358/136 |
| 4,202,011 | 5/1980 | Koga | 358/136 |
| 4,460,923 | 7/1984 | Hirano et al. | 358/136 |
| 4,562,468 | 12/1985 | Koga | 358/136 |
| 4,672,441 | 6/1987 | Hoelzlwimmer et al. | 358/136 |
| 4,689,672 | 8/1987 | Furukawa et al. | 358/136 |

OTHER PUBLICATIONS

Patent application Ser. No. 07/495525 filed Mar. 19, 1990 entitled "A High Definition Television Arrangement Employing Motion Compensated Prediction Error Signals", by S. C. Knauer et al.

Patent application Ser. No. 07/495523 filed Mar. 19, 1990 entitled "A High Definition Television Arrangement with Signal Selections Adapted to the Available Transmission Capacity", by S. C. Knauer et al.

Patent application Ser. No. 07/495507 filed Mar. 19, 1990 entitled "A High Definition Television Arrangement Including Noise Immunity Means", by S. C. Knauer et al.

Patent application Ser. No. 07/495559 filed Mar. 19, 1990 entitled "A Television Signal Arrangement Where Selected Signals are Encoded Digitally", by S. C. Knauer et al.

"Digital Pictures" by A. N. Netravali and B. G. Haskell, Plenum Press, 1988, p. 334 et seq.

"A Visual Model Weighted Cosine Transform for Image Compression and Quality Assessment", by Nill in IEEE Transactions on Communications, vol. COM-33, No. 6, Jun., 1985, pp. 551–557.

"Image quality measure based on a human visual system model", by Saghri et al., Optical Engineering, vol. 28, No. 7, Jul. 1989, pp. 813–818.

"Adaptive Quantization of Picture Signals using Spatial Masking", by Netravali et al., Proceedings of IEEE, vol. 65, Apr. 1977, pp. 536–548.

"Design of Statistically Based Buffer Control Policies for Compressed Digital Video", Zdepski et al., 1989 IEEE Conference, pp. 1343–1349.

Primary Examiner—John K. Peng
Attorney, Agent, or Firm—Henry T. Brendzel

[57] ABSTRACT

A quantizer, with quantization control that is sensitive to input signal characteristics and to output buffer fullness responds to an input signal that is divided into blocks and DCT transformed. The transformed signal is analyzed to develop a brightness correction and to evaluate the texture of the image and the change in texture in the image. Based on these, and in concert with the human visual perception model, perception threshold signals are created for each subband of the transformed signal. Concurrently, scale factors for each subband of the transformed signal are computed, and a measure of variability in the transformed input signal is calculated. A measure of the fullness of the buffer to which the quantizer sends its encoded results is obtained, and that measure is combined with the calculated signal variability to develop a correction signal. The correction signal modifies the perception threshold signals to develop threshold control signals that are applied to the quantizer. The scale factors are also applied to the quantizer, as well as a global target distortion measure.

31 Claims, 11 Drawing Sheets

ADAPTIVE NON-LINEAR QUANTIZER

CROSS-REFERENCE TO RELATED APPLICATION

This application is related to four other applications filed on this date. Their titles are:
1. A High Definition Television Coding Arrangement With Graceful Degradation
2. An Adaptive Leak HDTV Encoder
3. HDTV Encoder with Forward Estimation and Constant Rate Motion Vectors
4. HDTV Receiver

BACKGROUND OF THE INVENTION

This invention relates to encoding of signals, and more specifically, to encoding of signals with a controlled quantizer.

When image signals are digitized and linearly quantized, a transmission rate of about 100 Mbits per second is necessary for images derived from standard TV signals. For HDTV, with its greater image size and greater resolution, a much higher transmission rate would be is required. When terrestrial transmission is desired, and when the option of allocating greater bandwidth per channel is unavailable, it is necessary to compress the HDTV signal within the allocated bandwidth. Having an allocated bandwidth is tantamount to having a certain number of information bits that can be transmitted in each selected time interval, such as an image frame. All of the compression techniques of HDTV signals must of necessity consider this bit budget.

In order to reduce the bit rate, or to fit the encoded signal of an image frame within the allocated bit budget, various coding schemes have been studied. One is the so-called "differential pulse code modulation" (DPCM) coding approach. By this method, the value of a particular pixel at any moment is predicted on the basis of values of pixels which have been already coded. The necessary number of bits is reduced by coding the difference (error) between the predicted value and the value of the particular pixel at that moment. According to this differential pulse code modulation, it is possible to reduce the number of bits per pixel by approximately half.

Still, that number is much larger than can be accepted for terrestrial transmission, so a second look is typically taken at the quantizer itself. Clearly, if the step size of the quantizer is made large enough, the number of bits generated can be reduced to an acceptable level. Alas, the quantization error resulting therefrom would yield a picture that is far from acceptable.

Experiments show, and it is quite logical, that the effect of quantization error is different for different types of picture and, expectedly, artisans have tried to tailor quantizers to the pictures being encoded.

U.S. Pat. No. 4,802,232 issued Jan. 31, 1989, for example, describes one such attempt. In accordance with the described approach the picture to be encoded is divided into regions and each region of the input image is classified into one of a preset number of classes. The signal of each class is quantized in a specified manner, and the manner of quantization of the different classes, of course, differ. The limitation of this approach is the hard decisions boundaries between the classes.

Nill in "A Visual Model Weighted Cosine Transform for Image Compression and Quality Assessment", IEEE Transactions on Communications, Vol. COM-33, No. 6, June, 1985, pg. 551-557 and Saghri et al. "Image quality measure based on a human visual system model", Optical Engineering, Vol. 28, No. 7, July 1989, pg. 813-818, describe very similar approaches. These approaches utilize fixed global thresholds for each frequency band, where the thresholds are set based on a model of the human visual systems (HVS) modulation transfer function (MTF), and the transform utilized. The limitation of this approach is that the quantization cannot adapt to local characteristics of the image.

In "Adaptive Quantization of Picture Signals using Spatial Masking", Proceedings of IEEE, Vol. 65, April 1977, pg. 536-548, Netravali et al. describe a means of designing non-uniform quantizers to incorporate spatial masking and brightness correction for predictive coding systems. The limitation of their approach, again, is that the quantization cannot adapt to local characteristics of the image.

In "Design of Statistically Based Buffer Control Policies for Compressed Digital Video", Zdepski et al., an IEEE conference, 1989, pg. 1343-1349, describe an approach where the quantizer in the DPCM loop interacts with an adaptive mode control circuit. The circuit measures the number of bits generated by the quantizer and, based on preselected thresholds, decides for the next frame on one of eight possible quantizer step sizes. The selected step size is employed for the next frame. A similar approach is described in "Digital Pictures" by A. N. Netravali and B. G. Haskell, Plenum Press, 1988, pg. 537 et seq.

The deficiency of these methods is that the quantization steps are altered in discrete jumps and in that no accounting is made of a global distortion target.

It is an object of this invention, therefore, to develop means for controlling the quantizer so that the number of bits generated per frame is, on the average, within the allocated bit budget.

It is another object of this invention to control the quantizer in a manner that is sensitive to the characteristics of the input signal to which human viewers are sensitive.

It is still another object of this invention to control the quantizer in a manner that spreads as evenly as possible the unavoidable quantization noise.

SUMMARY OF THE INVENTION

These and other objects are achieved with a quantizer control mechanism that is responsive to both the input signal and the fullness of the output buffer. More specifically, the input image is divided into blocks and the signal of each block is DCT transformed. The transformed signal is analyzed to develop a brightness correction and to evaluate the texture of the image and the change in texture in the image. Based on these, and in concert with the human visual perception model, perception threshold signals are created for each subband of the transformed signal.

Concurrently, scale factors for each subband of the transformed signal are computed, and a measure of variability in the transformed input signal is calculated. A measure of the fullness of the buffer to which the quantizer sends its encoded results is obtained, and that measure is combined with the calculated signal variability to develop a correction signal. The correction signal modifies the perception threshold signals to develop threshold control signals that are applied to the quantizer. The scale factors are also applied to the quantizer, as well as a global target distortion measure.

The quantizer pre-multiplies the input signal by the scale factors and quantizes the signal in a manner that is sensitive to the threshold control signals. The quantization itself is performed a number of times by scanning a codebook that specifies the exact manner of quantizing of each of the subbands of the transformed signal. Accounting for the global target distortion, the best quantization result is selected and sent to the aforementioned buffer.

DETAILED DESCRIPTION

The motion estimation principles of this invention start with the proposition that for a given bit budget, a much better overall prediction error level can be attained by employing blocks of variable sizes. Starting with large sized blocks that handle large image sections for which a good translation vector can be found, the motion vector selection in accordance with this invention then replaces, or adds, to some of motion vectors for the large blocks with motion vectors for the small blocks.

While these principles of the invention can be put to good use in the prediction of other types of signals, it is clear that it is quite useful in connection with the encoding of HDTV signals. However, in the HDTV application there is simply not enough time within the encoding loop to compute the best motion vectors and to then select the best mix of motion vectors. Accordingly, a forward estimation section is incorporated in the encoder, and that section creates as many of the signals used within the encoder as it is possible. The input image signal is, of course, appropriately delayed so that the need for the signals that are computed within the forward estimation section does not precede their creation.

In order to appreciate the operation of the motion vector selection and encoding processes improvement of this invention serves, the following describes the entire coder section of an HDTV transmitter. The principles of this invention are, of course, primarily described in connection with the motion vector estimation and selection circuits depicted of FIG. 1.

DETAILED DESCRIPTION

Quantization of the signals is one of the most important tasks that the HDTV transmitter must perform. The quantizer, however, is but a part of the entire encoding loop. Moreover, the encoding loop, generally, and the quantizer, in particular, require a number of signals that need a substantial period of time for computation. Fortunately, it is possible to compute these signals in a forward estimation section, which "off line" as far as the encoding loop is concerned.

To better understand the function and workings of the quantizer of this invention, the following describes the entire coder section of an HDTV transmitter, i.e., both the forward estimation section and the encoding loop. The detailed principles of this invention are primarily described in connection with the perceptual encoder circuit, the quantizer circuit, and the associated circuits.

Figure 1:
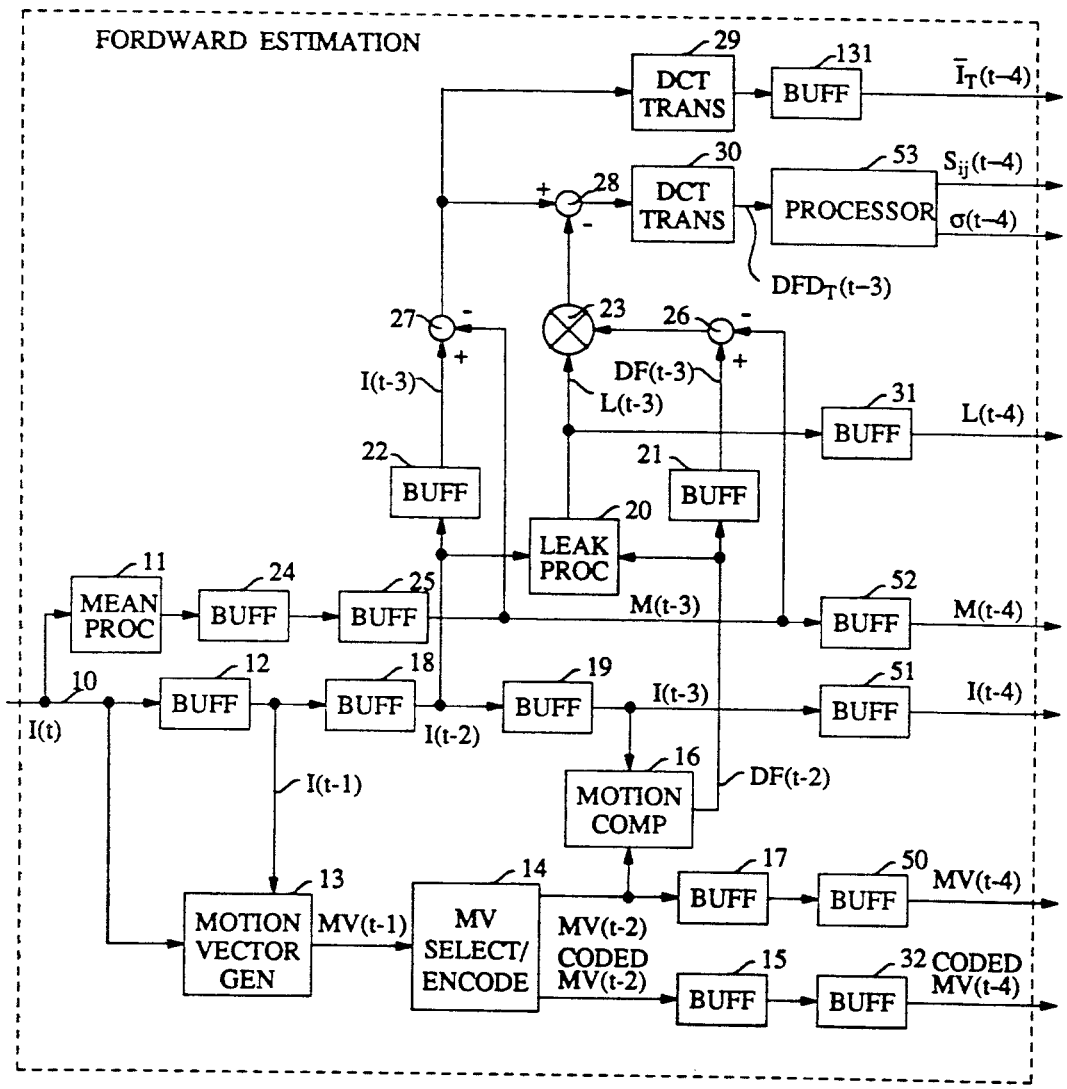
FIG. 1 presents a block diagram of a forward estimation section of an HDTV digital encoder.

In FIG. 1, the input signal is applied at line 10. It is a digitized video signal that arrives in sequences of image frames. This input signal is applied to frame-mean processor 11, to buffer 12, and to motion vector generator 13. The output of buffer 12 is also applied to motion vector generator block 13. Frame-mean processor 11 develops the mean value of each incoming frame. That value is delayed in buffers 24 and 25, and applied to a number of elements within FIG. 1, as described below. It is also sent to the encoding loop of FIG. 2 through buffer 52. Motion vector generator 13 develops motion vectors which are applied to motion vector selector/encoder 14 and, thereafter, through buffers 15 and 32, wherefrom the encoded motion vectors are sent to the encoding loop of FIG. 2. The unencoded output of motion vector selector/encoder 14 is also applied to motion compensator block 16, and to buffer 17 followed by buffer 50, wherefrom the unencoded motion vectors are sent to the encoding loop of FIG. 2.

Figure 2:
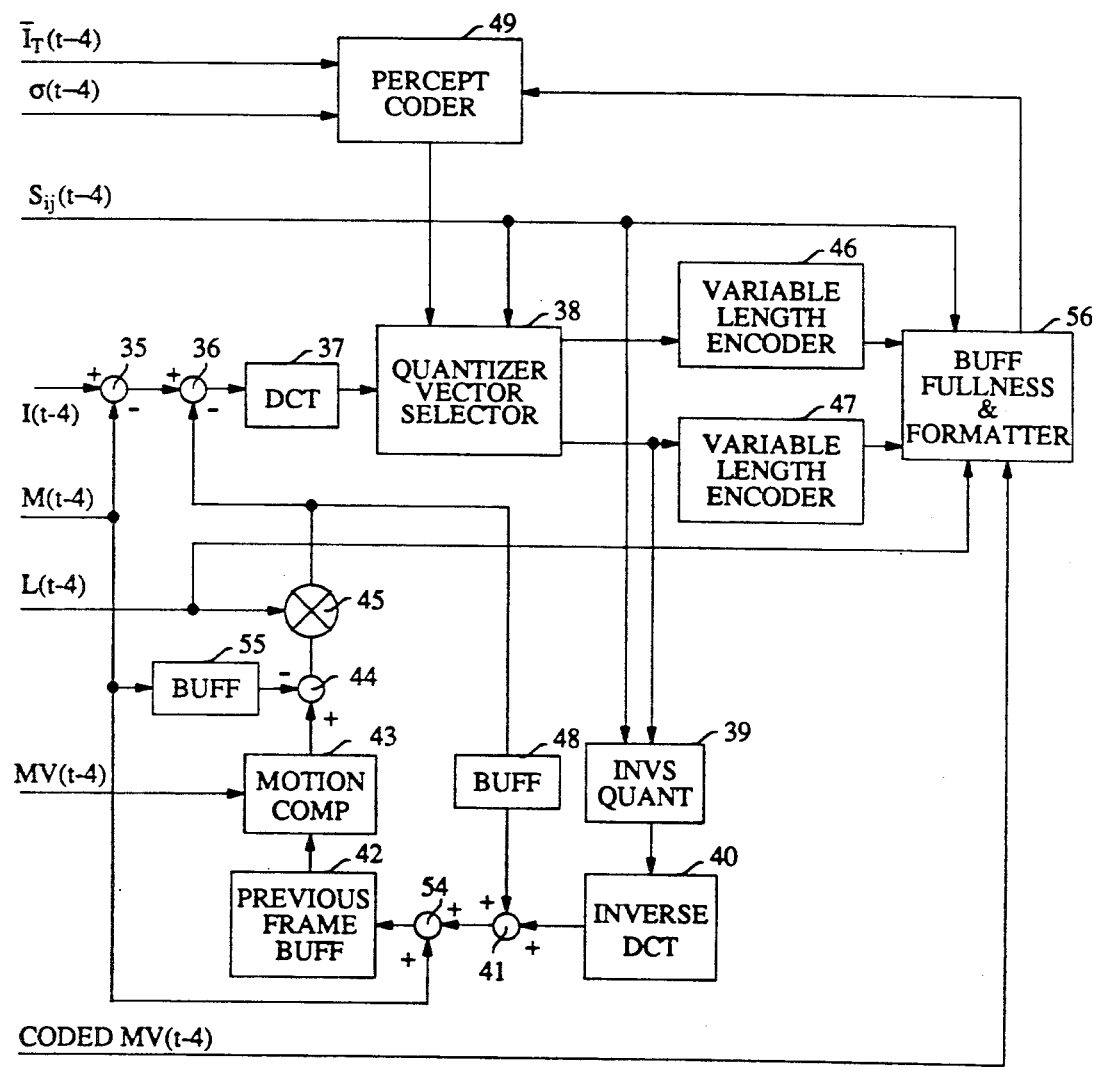
FIG. 2 presents a block diagram of an encoding loop section of an HDTV encoder that interacts with the forward estimation section of FIG. 1.

The output of buffer 12 is applied to buffer 18 and thereafter to buffers 19 and 51, wherefrom it is sent to the encoding loop of FIG. 2. The output of buffer 18 is applied to buffer 22 and to leak factor processor 20, and the output of buffer 19 is applied to motion compensator circuit 16. The output of motion compensator 16 is applied to buffer 21 and to leak factor processor 20.

The frame-mean signal of buffer 25 is subtracted from the output of buffer 21 in subtracter 26 and from the output of buffer 22 in subtracter 27. The outputs of subtracter 26 and leak processor 20 are applied to multiplier 23, and the output of multiplier 23 is applied to subtracter 28. The output of leak processor 20 is also sent to the encoding loop of FIG. 2 via buffer 31. Element 28 subtracts the output of multiplier 23 from the output of subtracter 27 and applies the result to DCT transform circuit 30. The output of transform circuit 30 is applied to processor 53 which computes scale factors $S_{ij}$ and signal standard deviation $\sigma$ and sends its results to FIG. 2. The output of subtracter 27 is applied to DCT transform circuit 29, and the output of DCT circuit 29 is sent to the encoding loop of FIG. 2.

To get a sense of the timing relationship between the various elements in FIG. 1, it is useful to set a benchmark, such as by asserting that the input at line 10 corresponds to the image signal of frame t; i.e., that the input signal at line 10 is I(t). All of the buffers in FIG. 1 store and delay one frame's worth of data. Hence, the output of buffer 12 is I(t-1), the output of buffer 18 is I(t-2), the output of buffer 19 is I(t-3), and the output of buffer 51 is I(t-4).

Motion vector generator 13 develops motion vectors M(t) that (elsewhere in the encoder circuit and in the decoder circuit) assist in generating an approximation of frame I(t) based on information of frame I(t-1). It takes some time for the motion vectors to be developed (an internal delay is included to make the delay within generator 13 equal to one frame delay). Thus, the output of generator 13 (after processing delay) corresponds to a set of motion vectors MV(t-1). Not all of the motion vectors that are created in motion vector generator 13 are actually used, so the output of generator 13 is applied to motion vector selector/encoder 14 where a selection process takes place. Since the selection process also takes time, the outputs of selector/encoder 14 are MV(t-2) and the CODED MV(t-2) signals, which are the motion vectors, and their coded representations, that assist in generating an approximation of frame I(t-2) based on information of frame I(t-3). Such an I(t-2) signal is indeed generated in motion compensator 16, which takes the I(t-3) signal of buffer 19 and the motion vectors of selector/encoder 14 and develops therefrom a displaced frame signal DF(t-2) that approximates the signal I(t-2). Buffers 17 and 50 develop MV(t-4) signals, while buffers 15 and 32 develop the CODED MV(t-4) signals.

As indicated above, processor 11 develops a frame-mean signal. Since the mean signal cannot be known until the frame terminates, the output of processor 11 relates to frame t-1. Stated differently, the output of processor 11 is M(t-1) and the output of buffer 25 is M(t-3).

Leak factor processor 20 receives signals I(t-2) and DF(t-2). It also takes time to perform its function (and internal delay is included to insure that it has a delay of exactly one frame), hence the output signal of processor 20 corresponds to the leak factor of frame (t-3). The output of processor 20 is, therefore, designated L(t-3). That output is delayed in buffer 31, causing L(t-4) to be sent to the encoding loop.

Lastly, the processes within elements 26-30 are relatively quick, so the transformed image ($\bar{I}_T$) and displaced frame difference (DFD$_T$) outputs of elements 29 and 30 correspond to frame $\bar{I}_T$(t-3) and DFD$_T$(t-3), respectively, and the output of processor 53 corresponds to $S_{ij}$(t-4) and $\sigma$(t-4).

FIG. 2 contains the encoding loop that utilizes the signals developed in the forward estimation section of FIG. 1. The loop itself comprises elements 36, 37, 38, 39, 40, 41, 54, 42, 43, 44 and 45. The image signal I(t-4) is applied to subtracter 36 after the frame-mean signal M(t-4) is subtracted from it in subtracter 35. The signal developed by subtracter 36 is the difference between the image I(t-4) and the best estimation of image I(t-4) that is obtained from the previous frame's data contained in the encoding loop (with the previous frame's frame-mean excluded via subtracter 44, and with a leak factor that is introduced via multiplier 45). That frame difference is applied to DCT transform circuit 37 which develops 2-dimensional transform domain information about the frame difference signal of subtracter 36. That information is encoded into vectors within quantizer-and-vector-selector (QVS) 38 and forwarded to encoders 46 and 47. The encoding carried out in QVS 38 and applied to encoder 47 is reversed to the extent possible within inverse quantizer 39 and applied to inverse DCT circuit 40.

The output of inverse DCT circuit 40 approximates the output of subtracter 36. However, it does not quite match the signal of subtracter because only a portion of the encoded signal is applied to element 39 and because it is corrupted by the loss of information in the encoding process of element 38. There is also a delay in passing through elements 37, 38, 39, and 40. That delay is matched by the delay provided by buffer 48 before the outputs of buffer 48 and inverse DCT transform circuit 40 are combined in adder 41 and applied to adder 54. Adder 54 adds the frame-mean signal M(t-4) and applies the results to buffer 42. Buffer 42 complements the delay provided by buffer 48 less the delay in elements 43, 44 and 45 (to form a full one frame delay) and delivers it to motion compensator 43.

Motion compensator 43 is responsive to the motion vectors MV(t-4). It produces an estimate of the image signal I(t-4), based on the approximation of I(t-5) offered by buffer 42. As stated before, that approximation is diminished by the frame-mean of the previous frame, M(t-5), through the action of subtracter 44. The previous frame's frame-mean is derived from buffer 55 which is fed by M(t-4). The results of subtracter 44 are applied to multiplier 45 which multiplies the output of subtracter 44 by the leak factor L(t-4). The multiplication results form the signal to the negative input of subtracter 36.

It may be noted in passing that the action of motion compensator 43 is linear. Therefore, when the action of buffer 42 is also linear—which means that it does not truncate its incoming signals—then adder 54 and subtracter 44 (and buffer 55) are completely superfluous. They are used only when buffer 42 truncates its incoming signal to save on the required storage.

Figure 17:
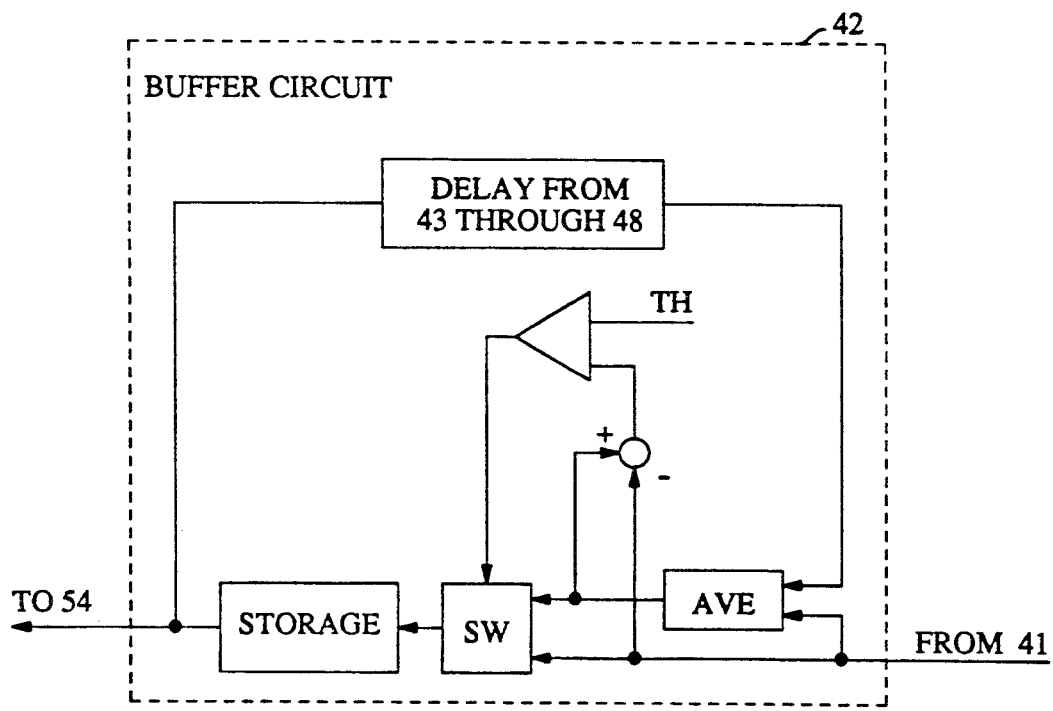
FIG. 17 a frame buffere circuit that includes a measure of temporal filtering.

In connection with buffer 42, another improvement is possible. When the processing within elements 36, 37, 38, 39, and 40 and the corresponding delay of buffer 48 are less than the vertical frame retrace interval, the output of buffer 42 can be synchronized with its input, in the sense that pixels of a frame exit the buffer at the same time that corresponding pixels of the previous frame exit the buffer. Temporal filtering can then be accomplished at this point by replacing buffer 42 with a buffer circuit 42 as shown in FIG. 17. In buffer circuit 42, the incoming pixel is compared to the outgoing pixel. When their difference is larger than a certain threshold, the storage element within circuit 42 is loaded with the average of the two compared pixels. Otherwise, the storage element within buffer 42 is loaded with the incoming pixel only.

QVS 38 is also responsive to perceptual coder 49 and to $S_{ij}$(t-4). That coder is responsive to signals $\bar{I}_T$(t-4) and $\sigma$(t-4). Signals $S_{ij}$(t-4) are also sent to inverse quantization circuit 39 and to buffer fullness and formatter (BFF) 56. BFF block 56 also receives information from encoders 46 and 47, the leak signal L(t-4) and the CODED MV(t-4) information from buffer 32 in FIG. 1. BFF block 56 sends fullness information to perceptual coder 49 and all if its received information to subsequent circuitry, where the signals are amplified, appropriately modulated and, for terrestrial transmission, applied to a transmitting antenna.

BFF block 56 serves two closely related functions. It packs the information developed in the encoders by applying the appropriate error correction codes and arranging the information, and it feeds information to perceptual coder 49, to inform it of the level of output buffer fullness. The latter information is employed in perceptual coder 49 to control QVS 38 and inverse quantizer 39 and, consequently, the bit rate of the next frame.

The general description above provides a fairly detailed exposition of the encoder within the HDTV transmitter. The descriptions below delve in greater detail into each of the various circuits included in FIGS. 1 and 2.

FRAME-MEAN CIRCUIT 11

The mean, or average, signal within a frame is obtainable with a simple accumulator that merely adds the values of all pixels in the frame and divides the sum by a fixed number. Adding a binary number of pixels offers the easiest division implementation, but division by any other number is also possible with some very simple and conventional hardware (e.g., a look-up table). Because of this simplicity, no further description is offered herein of circuit 11.

MOTION VECTOR GENERATOR 13

The motion vector generator compares the two sequential images I(t) and I(t-1), with an eye towards detecting regions, or blocks, in the current image frame, I(t), that closely match regions, or blocks, in the previous image frame, I(t-1). The goal is to generate relative displacement information that permits the creation of an approximation of the current image frame from a combination of the displacement information and the previous image frame.

More specifically, the current frame is divided into $n \times n$ pixel blocks, and a search is conducted for each block in the current frame to find an $n \times n$ block in the previous frame that matches the current frame block as closely as possible.

If one wishes to perform an exhaustive search for the best displacement of an $n \times n$ pixel block in a neighborhood of a $K \times K$ pixel array, one has to test all of the possible displacements, of which there are $(K-n) \times (K-n)$. For each of those displacements one has to determine the magnitude of the difference (e.g., in absolute, RMS, or square sense) between the $n \times n$ pixel array in the current frame and the $n \times n$ portion of the $K \times K$ pixel array in the previous frame that corresponds to the selected displacement. The displacement that corresponds to the smallest difference is the preferred displacement, and that is what we call the motion vector.

One important issue in connection with a hardware embodiment of the above-described search process is the shear volume of calculations that needs to be performed in order to find the absolutely optimum motion vector. For instance, if the image were subdivided into blocks of $8 \times 8$ pixels and the image contains $1024 \times 1024$ pixels, then the total number of blocks that need to be matched would be $2^{14}$. If an exhaustive search over the entire image were to be performed in determining the best match, then the number of searches for each block would be approximately $2^{20}$. The total count (for all the blocks) would then be approximately $2^{34}$ searches. This "astronomical" number is just too many searches!

One approach for limiting the required number of searches is to limit the neighborhood of the block whose motion vector is sought. In addition to the direct reduction in the number of searches that must be undertaken, this approach has the additional benefit that a more restricted neighborhood limits the number of bits that are required to describe the motion vectors (smaller range), and that reduces the transmission burden. With those reasons in mind, we limit the search neighborhood in both the horizontal and vertical directions to $\pm 32$ positions. That means, for example, that when a $32 \times 16$ pixel block is considered, then the neighborhood of search is $80 \times 80$ pixels, and the number of searches for each block is $2^{12}$ (compared to $2^{20}$).

As indicated above, the prediction error can be based on a sum of squares of differences, but it is substantially simpler to deal with absolute values of differences. Accordingly, the motion vector generator herein compares blocks of pixels in the current frame with those in the previous frame by forming prediction error signals that correspond to the sum over the block of the absolute differences between the pixels.

To further reduce the complexity and size of the search, a two-stage hierarchical motion estimation approach is used. In the first stage, the motion is estimated coarsely, and in the second stage the coarse estimation is refined. Matching in a coarse manner is achieved in the first stage by reducing the resolution of the image by a factor of 2 in both the horizontal and the vertical directions. This reduces the search area by a factor of 4, yielding only $2^{12}$ blocks in a $1024 \times 1024$ image array. The motion vectors generated in the first stage are then passed to the second stage, where a search is performed in the neighborhood of the coarse displacement found in the first stage.

Figure 3:
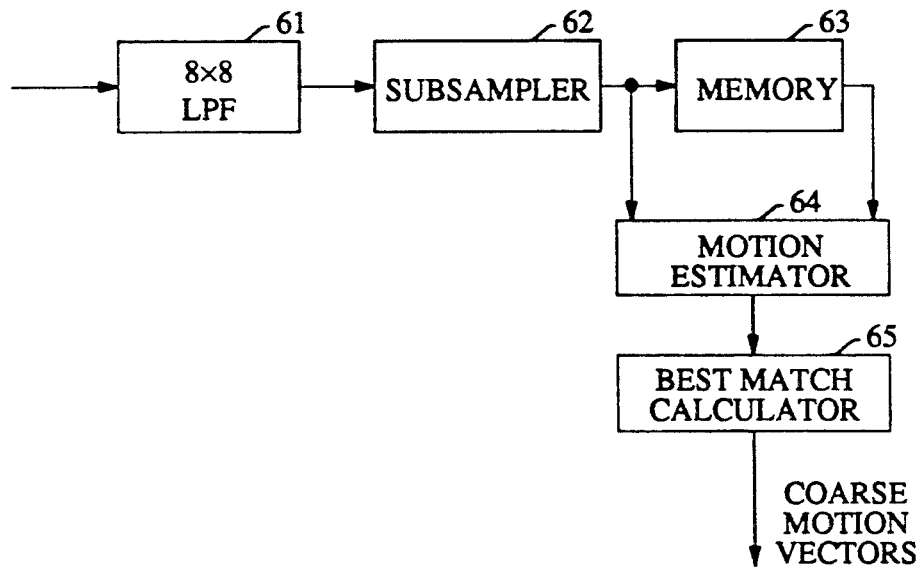
FIG. 3 depicts a hardware organization for a coarse motion vector detector.

FIG. 3 depicts the structure of the first (coarse) stage in the motion vector generator. In FIG. 3 the input signal is applied to a two-dimensional, 8 pixel by 8 pixel low-pass filter 61. Filter 61 eliminates frequencies higher than half the sampling rate of the incoming data. Subsampler 62 follows filter 61. It subsamples its input signal by a 2:1 factor. The action of filter 61 insures that no aliasing results from the subsampling action of element 62 since it eliminates signals above the Nyquist rate for the subsampler. The output of subsampler 62 is an image signal with half as many pixels in each line of the image, and half as many lines in the image. This corresponds to a four-fold reduction in resolution, as discussed above.

In FIG. 1, motion vector generator 13 is shown to be responsive to the I(t) signal at input line 10 and to the I(t-1) signal at the output of buffer 12. This was done for expository purposes only, to make the operation of motion vector 13 clearly understandable in the context of the FIG. 1 description. Actually, it is advantageous to have motion vector generator 13 be responsive solely to I(t), as far as the connectivity of FIG. 1 is concerned, and have the delay of buffer 12 be integrated within the circuitry of motion vector generator 13.

Consonant with this idea, FIG. 3 includes a frame memory 63 which is responsive to the output of subsampler 62. The subsampled I(t) signal at the input of frame memory 63 and the subsampled I(t-1) signal at the output of frame memory 63 are applied to motion estimator 64.

The control of memory 63 is fairly simple. Data enters motion estimator block 64 is sequence, one line at a time. With every sixteen lines of the subsampled I(t), memory 64 must supply to motion estimator block 64 sixteen lines of the subsampled I(t-1); except offset forward by sixteen lines. The 32 other (previous) lines of the subsampled I(t-1) that are needed by block 64 are already in block 64 from the previous two sets of sixteen lines of the subsampled I(t) signal that were applied to motion estimator block 64.

Motion estimator 64 develops a plurality of prediction error signals for each block in the image. The plurality of prediction error signals is applied to best-match calculator 65 which identifies the smallest prediction error signal. The displacement corresponding to that prediction error signal is selected as the motion vector of the block.

Expressed in more mathematical terms, if a block of width w and height h in the current frame block is denoted by b(x,y,t), where t is the current frame and x and y are the north-west corner coordinates of the block, then the prediction error may be defined as the sum of absolute differences of the pixel values:

$$PE(x,y,w,h,r,s) = \sum_{i=x}^{x+w} \left[ \sum_{j=y}^{y+h} |b(i-r, j-s, t-1) - b(i,j,t)| \right] \quad (1)$$

where r and s are the displacements in the x and y directions, respectively.

The motion vector that gives the best match is the displacement (r,s) that gives the minimum prediction error.

The selection of the motion vector is performed in calculator 65. In cases where there are a number of vectors that have the same minimum error, calculator 65 selects the motion vector (displacement) with the smallest magnitude. For this selection purpose, magnitudes are defined in calculator 65 as the sum of the magnitudes of the horizontal and vertical displacement, i.e., $|r| + |s|$.

In the second stage of motion vector generator 13, a refined determination is made as to the best displacement value that can be selected, within the neighborhood of the displacement selected in the first stage. The second stage differs from the first stage in three ways. First, it performs a search that is directed to a particular neighborhood. Second, it evaluates prediction error values for 8×8 blocks and a 4×2 array of 8×8 blocks (which in effect is a 32×16 block). And third, it interpolates the end result to ½ pixel accuracy.

Figure 4:
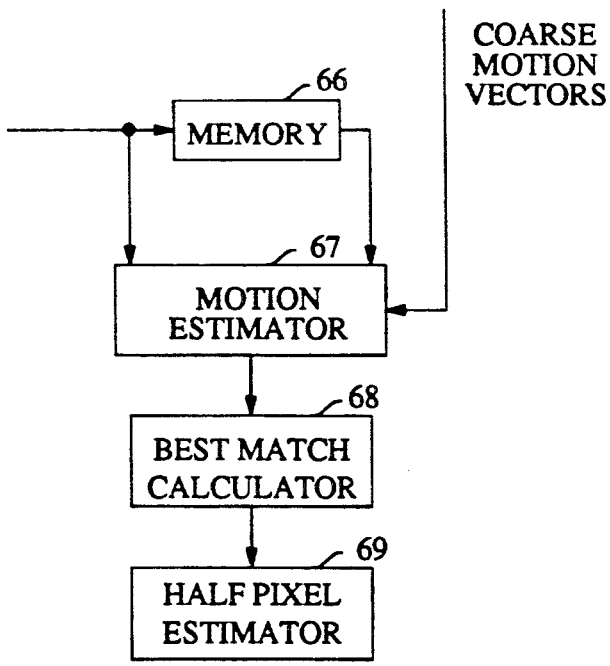
FIG. 4 depicts a hardware organization for a fine motion vector detector that takes into account the output of the coarse motion vector detector.

FIG. 4 presents a general block diagram of the second stage of generator 13. As in FIG. 3, the input signal is applied to frame memory 66. The input and the output of memory 66 are applied to motion estimator 67, and the output of motion estimator 67 is applied to best match calculator 68. Estimator 67 is also responsive to the coarse motion vector estimation developed in the first stage of generator 13, whereby the estimator is caused to estimate motion in the neighborhood of the motion vector selected in the first stage of generator 13.

Calculator 68 develops output sets with 10 signals in each set. It develops eight 8×8 block motion vectors, one 32×16 motion vector that encompass the image area covered by the eight 8×8 blocks, and a measure of the improvement in motion specification (i.e., a lower prediction error) that one would get by employing the eight 8×8 motion vectors in place of the associated 32×16 motion vector. The measure of improvement can be developed in any number of ways, but one simple way is to maintain the prediction errors of the 8×8 blocks, develop a sum of those prediction errors, and subtract the developed sum from the prediction error of the 32×16 motion vector.

The motion vector outputs of calculator 68 are applied in FIG. 4 to half pixel estimator 69. Half pixel motion is deduced from the changes in the prediction errors around the region of minimum error. The simple approach used in estimator 69 is to derive the half pixel motion independently in the x and y directions by fitting a parabola to the three points around the minimum, solving the parabola equation, and finding the position of the parabola's minimum. Since all that is desired is ½ pixel accuracy, this process simplifies to performing the following comparisons:

$$\text{if } (p_{x-1} - p_x) < \frac{(p_{x+1} - p_x)}{3} \text{ then } x' = x - \frac{1}{2} \quad (2)$$

and $$\text{if } (p_{x+1} - p_x) < \frac{(p_{x-1} - p_x)}{3} \text{ then } x' = x + \frac{1}{2} \quad (3)$$

where $p_x$ is the prediction error at x, and x' is the deduced half pixel motion vector.

The searches in both stages of motion vector generator 13 can extend over the edges of the image to allow for the improved prediction of an object entering the frame. The values of the pixels outside the image should be set to equal the value of the closest known pixel.

The above describes the structure of motion vector generator 13. All of the computational processes can be carried out with conventional processors. The processes that can most benefit from special purpose processors are the motion estimation processes of elements 64 and 67; simply because of the number of operations called for. These processes, however, can be realized with special purpose chips from LSI Logic Corporation, which offers a video motion estimation processor (L64720). A number of these can be combined to develop a motion estimation for any sized block over and sized area. This combining of L64720 chips is taught in an LSI Logic Corporation Application Note titled "LG720 (MEP) Video Motion Estimation Processor".

MOTION VECTOR SELECTOR/ENCODER 14

The reason for creating the 32×16 blocks is rooted in the expectation that the full set of motion vectors for the 8×8 blocks cannot be encoded in the bit budget allocated for the motion vectors. On the other hand, sending only 32×16 block motion vectors requires 28,672 bits—which results from multiplying the 14 bits per motion vector (7 bits for the horizontal displacement and 7 bits for the vertical displacement) by 32 blocks in the horizontal direction and 64 blocks in the vertical direction. In other words, it is expected that the final set of motion vectors would be a mix of 8×8 block motion vectors and 32×16 block motion vectors. It follows, therefore, that a selection must be made of the final mix of motion vectors that are eventually sent by the HDTV transmitter, and that selection must fit within a preassigned bit budget. Since the number of bits that define a motion vector depends on the efficacy of compression encoding that may be applied to the motion vectors, it follows that the selection of motion vectors and the compression of the selected motion vectors are closely intertwined.

Figure 5:
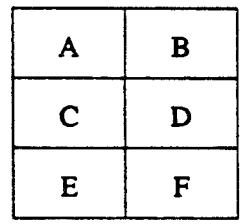
FIG. 5 illustrates the spatial relationship of what is considered a "slice" of image data.

The basic philosphy in the encoding process carried out in selector/encoder 14 is to fill the bit budget with as much detailed information as is possible. That is, the aim is to use as many of the 8×8 motion vectors as is possible. Our approach is to start with the set of 32×16 block motion vectors, compress this sequence of motion vectors, develop a measure of the number of bits left over from the preassigned bit budget, and then enter an iterative process that allocates the leftover bits. To simplify the process, the 32×16 motion vectors are grouped into sets, and each set is coded as a unit. The sets, or slices, that we employ are 2 by 3 arrays, (six 32×16 motion vectors in all) as depicted in FIG. 5.

The encoding process starts with encoder 14 (FIG. 1) developing the codes for the first six 32×16 motion vectors described above and compressing those codes with a variable length code, such as a Huffman coder. The first code in the group specifies a first 32×16 motion vector in the slice in an absolute sense. Thereafter, the remaining 5 motion vectors are specified by the difference between the vectors and the first vector. Following the 32×16 motion vectors of the slice, a bit is included to indicate whether any of the 32×16 blocks in the slice are also specified by the more refined information of the 8×8 motion vectors. If so, a code is provided that specifies which of the blocks are so more refinely specified, and thereafter, up to 6 times 8, or 48, codes specify the included 8×8 motion vectors.

Thus, the encoded format of the slice (with reference to FIG. 5) forms a packet as follows:

| field | # of bits | description |
|---|---|---|
| 1 | 1-16 | motion vector C |
| 2 | 1-16 | motion vector A-C |
| 3 | 1-16 | motion vector B-C |
| 4 | 1-16 | motion vector D-C |
| 5 | 1-16 | motion vector E-C |
| 6 | 1-16 | motion vector F-C |
| 7 | 1 | subdivisions in slice |
| 8 | 6 | identify subdivisions |
| 9+ | 1-14 | 8 × 8 motion vectors |

Figure 6:
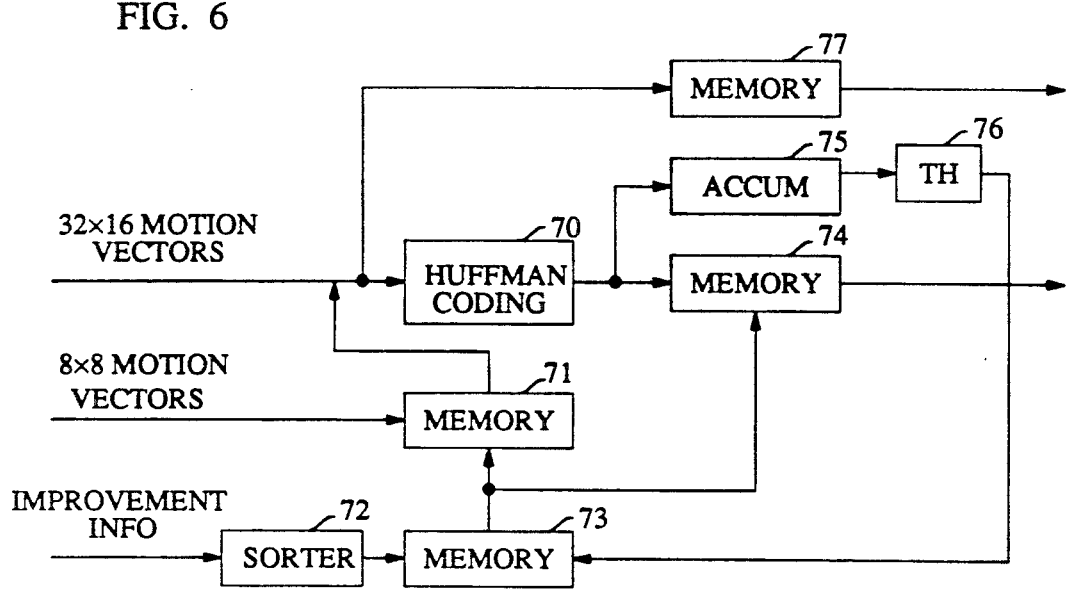
FIG. 6 shows one way for selecting a mix of motion vectors to fit within a given bit budget.

FIG. 6 presents a block diagram of selector/encoder 14. With each 32×16 motion vector that it receives from half pixel estimator 69, it also receives the associated 8×8 motion vectors and the improvement information. The incoming 32×16 motion vectors are sent to Huffman coder 70, the 8×8 motion vectors are sent to memory 71, and the improvement information is sent to sorter 72. Sorter 72 has an associated memory 73 for storing the relevant information about the improvement signals in sorted order, by the magnitude of the improvement; with the relevant information being the identity of the 32×16 block that is associated with the improvement value.

Huffman coder 70 develops a code for the first six fields of the slice packet and stores that information in memory 74. Concurrently, it accumulates in accumulator 75 the bits generated in the coding process. The number of bits developed in accumulator 75 is compared to the preassigned bit budget (which is a fixed number) in threshold detector 76. As long as that budget is not exceeded, threshold 76 sends a signal to memory 73 requesting it to access the identifier at the top of the sorted queue (and delete it from the queue). The identifier provided by memory 73 is applied to memory 71, where it causes memory 71 to output the eight 8×8 motion vectors associated with the 32×16 block. The motion vectors delivered by memory 71 are applied to Huffman coder 70 which compresses that information, adds the compressed information to memory 74 (under control of the memory 73 output signal), and accumulates the compressed bits in accumulator 75. This completes one iteration.

The operation of threshold circuit 76 and the entire iteration is repeated until the bit budget is exceeded. At that point, memory 74 contains the appropriate mix of coded motion vectors that are delivered to buffer 15 in FIG. 1. As depicted in FIG. 6, the uncoded motion vectors applied to Huffman circuit 70 are also applied to memory 77. Those vectors are applied to motion compensator circuit 16 and to buffer 17 in FIG. 1.

MOTION COMPENSATOR CIRCUITS

To develop its output signals, motion compensator circuit 16 (in FIG. 1) merely needs to access data in buffer 19 under control of the motion vectors selected by motion vector selector/encoder 14. This is easily achieved by having buffer 19 be a random access memory with multiplexed control. Output signals destined to motion compensator 16 are under control of the motion vectors, while output signals destined to buffer 51 are under control of a sequential counter.

Motion compensator circuit 43 (in FIG. 2) is identical to motion compensator circuit 16.

LEAK CIRCUIT

The leak circuit comprises leak processor 20 and multiplier 23. Multiplier 23 modifies the signals of motion compensator circuit 16 prior to their application to subtracter 28. Substracter 26 excludes the mean signal from considerations, in an effort to reduce the dynamic range of the signals considered in DCT transform circuits, 29 and 30.

The processing within element 20 takes some time, of course, and therefore, FIG. 1 includes buffers 21 and 22. Buffer 22 delays the image signal applied to subtracter 28, and buffer 21 delays the motion vectors signals sent by motion compensator circuit 16.

Directing attention to leak processor 20, one way to look at the leak circuit is as a mechanism for reducing the DFD (displaced frame difference) developed at the output of subtracter 28. The entire effort of developing good motion vectors, therefore, is to reduce the DFD out of subtracter 28. To the extent that the leak circuit can reduce the DFD further, its employment is beneficial.

One way to reduce the DFD is to minimize the DFD as a function of the leak variable $\alpha$. That is, the need is to determine $\alpha$ such that $$\frac{\partial E\{(I - \alpha DF)^2\}}{\partial \alpha} = 0. \tag{4}$$

where I is the image frame signal of buffer 18, DF is the displaced frame signal of motion compensator circuit 16, $\alpha$ is the multiplicative leak value, and $E\{X\}$ is the expected value of X. The solution to the above equation is $$a = \frac{E\{I \cdot DF\}}{E\{DF^2\}} \qquad (5)$$

Thus, one embodiment for processor 20 merely computes $a$, in accordance with equation (5) in response to signals I(t-2) and DF(t-2). The computations performed in processor 20, in such a case, are simple multiplications and averaging (sum and divide), so they are not described any further herein. Suffice it to state that processor 20 may be a conventional arithmetic processor (e.g., a DSP integrated circuit).

Although the calculations performed in processor 20 are straight forward, they are still rather numerous (though not anywhere near as numerous as the calculations needed for selecting the motion vectors). A somewhat simpler calculation task can be assigned to processor 20 by observing the following.

Considering the limits to which the leak factor should be subjected, it is clear, for example, that the leak factor cannot be allowed to reach and stay at 1.0. Some leak of the actual image must always be present. Otherwise, a receiver that freshly tunes to the transmitter cannot construct the image signal because it lacks all historical information; i.e., it never has the correct "previous frame" information to which the motion vectors can be successfully applied. Also, a noise accepted by the receiver would never disappear. Thus, a maximum level must be set on the long term value of the leak factor; such as 15/16.

It is also clear that when there is a scene change, a leak factor of value 0 is best, because it completely discards the old scene and begins to build a new one. It may be noted that scene changes are relatively frequent in commercial TV programs. Setting $a$ to 0 also helps in capturing the necessary historical information for freshly tuned-in receivers and for receivers who have corrupted historical information because of noise. Of course, the value of $a$ should not be maintained at 0 for too long because that creates a heavy transmission burden.

In view of the above, in its simpler form, the process carried out by processor 20 need only determine the occurrence of a scene change and set $a$ to 0 at every such occurrence. Thereafter, $a$ may be incremented at a preselected rate with every frame so that after m frames, the value of $a$ is allowed to reach $a_{max}$ (e.g., 15/16). Of course, if there is another scene change within the m frames, $a$ is again reset to 0 and the incrementing is restarted.

Figure 7:
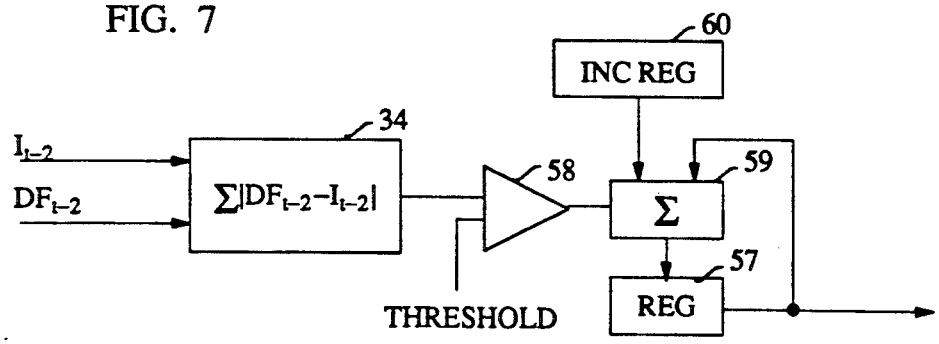
FIG. 7 presents one embodiment for evaluating a leak factor, $\alpha$.

This simple approach for developing $a$ can be implemented simply with a scene-change determining circuit, and an accumulator. The scene-change determining circuit may simply be a circuit that adds the magnitudes of the displaced frame difference signals; i.e., $\Sigma |I_{t-2} - DF_{t-2}|$. That provides a measure that, when compared to a threshold, determines whether a scene change has occurred. This is depicted in FIG. 7 where element 34 develops the sum signal $\Sigma |I_{t-2} - DF_{t-2}|$ and applies this signal to threshold circuit 58. The output of circuit 58 is applied to a disable lead of adder 59, which adds the value in threshold register 60 to the value in register 57. The output of register 57 is the leak factor, $a$.

A still another approach is to employ a fixed leak at the input to multiplier 23, and to develop a two level leak factor thereafter. By placing a processor 53 at the output of DCT transform 29 (in addition to the processor 53 at the output of DCT transform 30) two $\sigma$(t-4) signals are developed.

The leak factor that is sent to the encoding loop of FIG. 2 is selected based upon the two $\sigma$(t-4) signals developed. When there is a scene change, the two $\sigma$ signals will not differ much because the frame will have a poor prediction, resulting in a high value of the DFD standard deviation. In fact, the deviation of the DFD might even be higher than the standard deviation of the original frame. In such a case (i.e., when the two $\sigma$ signals differ by more than a chosen threshold), it is clear that a leak of 1 (no prediction) is to be selected and, accordingly, the leak factor $a = 0$ is sent to FIG. 2. When the two $a$ signals do differ by more than the chosen threshold, then a fixed leak factor, such as $a = 15/16$ is sent to FIG. 2.

Figure 16:
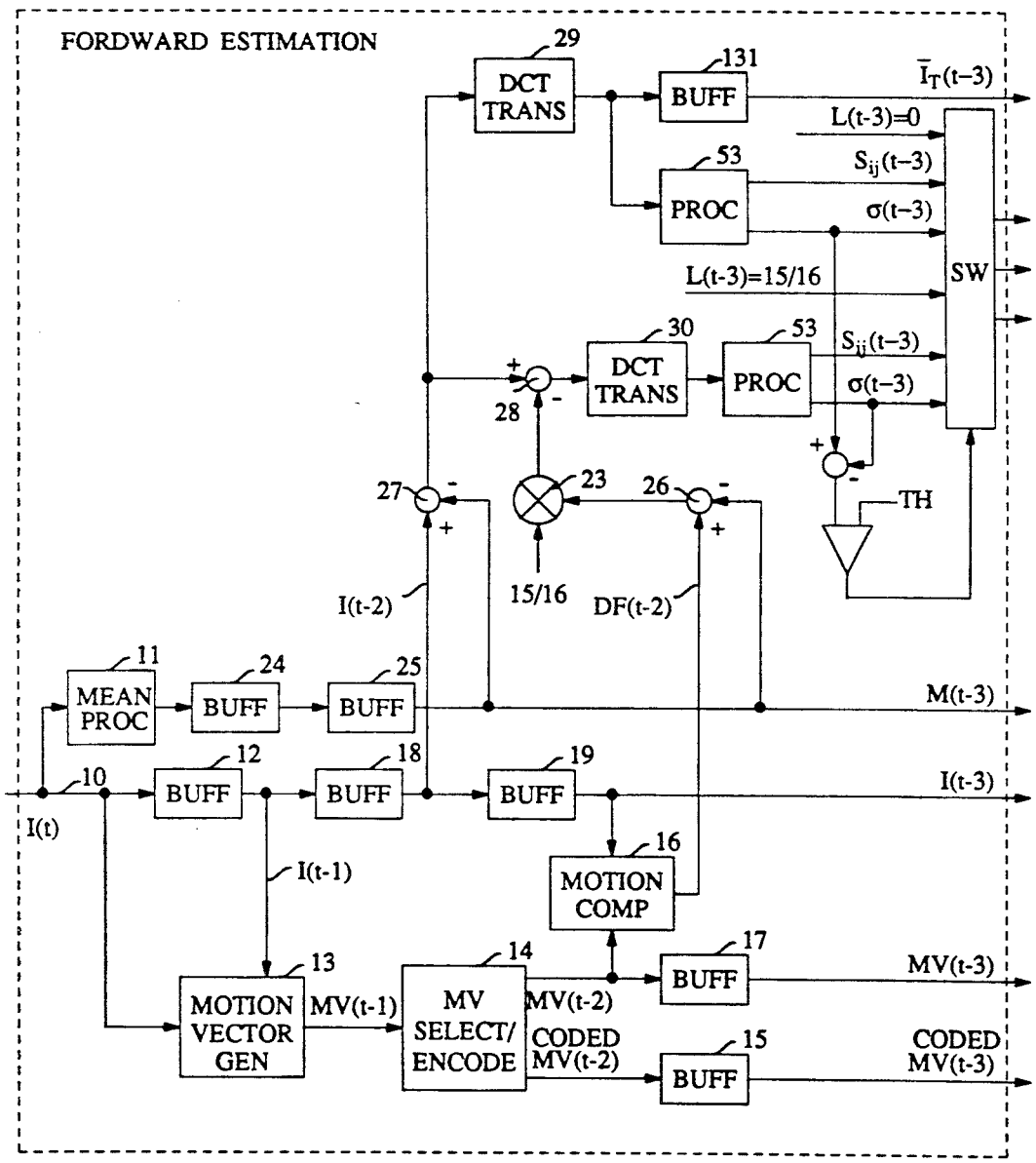
FIG. 16 presents a modified forward estimation block that choses a leak factor from a set of two fixed leak factors.

The block diagram of the forward estimation section of the encoder (i.e. FIG. 1), can be simplified somewhat by adopting this leak approach. This is shown in FIG. 16, where processor 20 is dropped, as well as a number of buffers. On the other hand, another processor 53 had to be added, a subtracter, a threshold device, and a selector that selected one of two sets of scale factors and standard deviation measures and either a leak factor of 0 or 15/16.

DCT TRANSFORM CIRCUITS

Transform circuits 29 and 30 (FIG. 1) and 37 and 40 (FIG. 2) develop two dimensional transform. Circuits 29, 30 and 37 convert time domain information into frequency domain information, and circuit 40 performs the inverse. The hardware for creating two dimensional transforms can follow the teachings of U.S. Pat. No. 4,829,465 issued May 9, 1989, titled "High Speed Cosine Transform".

PROCESSOR 53

Processor 53 computes scale factor signals $S_{ij}$ and standard deviation signal $\sigma$ for the frame. With an $8 \times 8$ DCT transform, there are 64 scale factor signals. The scale factor signals are developed by evaluating $$S_{ij} = \sqrt{\frac{1}{K_1} \sum_{\text{all blocks}} s_{ij}^2} \qquad (6)$$

where $s_{ij}$ is the frequency ij coefficients produced by DCT element 30 and $K_1$ is the number of $8 \times 8$ blocks in the frame. The standard deviation, $\sigma$, is a single value for the frame and it corresponds to $$\sigma = \sqrt{\frac{1}{K_2} \sum_{\text{all pixels}} s_{ij}^2} \qquad (7)$$

where $K_2$ is the number of pixels in the frame. Of course, these calculations can be performed quite easily with a conventional processor, since they only require squaring, adding and taking the square root. Still, since the answer cannot be ascertained before the entire frame has been processed, the outputs of processor 53 are marked $S_{ij}$(t-4) and $\sigma$(t-4).

QUANTIZER-AND-VECTOR-SELECTOR (QVS) 38

Figure 8:
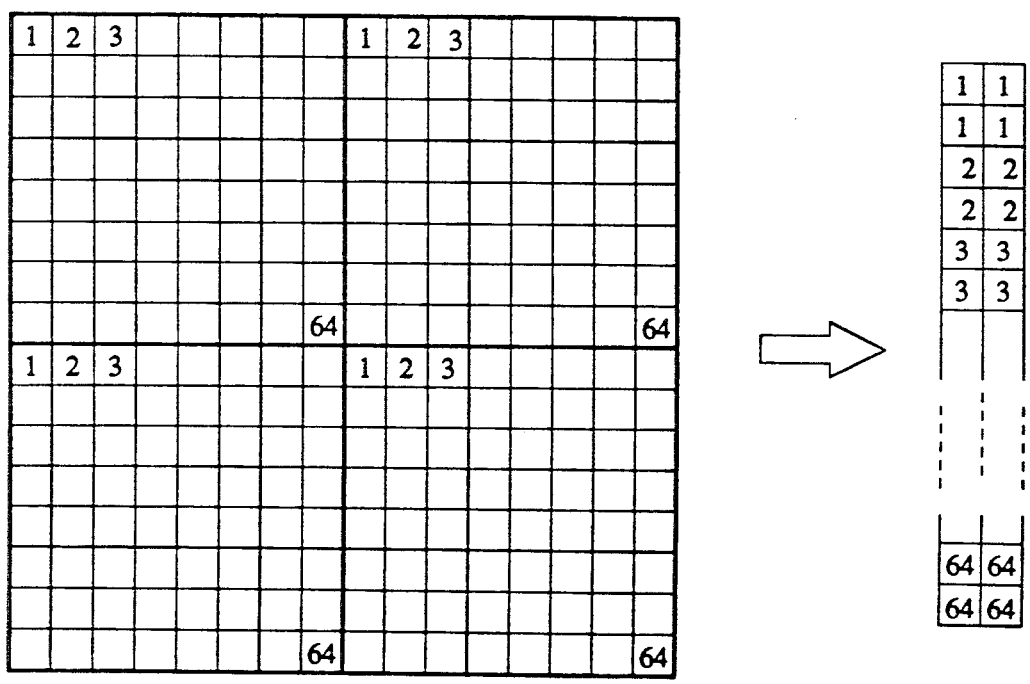
FIG. 8 illustrates the arrangement of a superblock that is quantized in QVS 38 block of FIG. 2.

DCT transform circuit 37 develops sets of $8 \times 8$ frequency domain coefficients. In order to simplify coding in QVS 38 which follows circuit 37, it is best to group these sets; and one possible such grouping is a 2×2 array. This is illustrated in FIG. 8 where a 2×2 array of 8×8 sets of coefficients (left side of the FIG.) are combined to form a 64 cell superblock vector (right side of the FIG.), where each cell contains 4 members. A first level of simplification is introduced by placing a restriction that the coefficients in each cell can be quantized only with one quantizer. A degree of sophistication is introduced by allowing a different quantizer to be used for quantizing different cells. The number of different quantizers is limited to a preselected number, such as 4, to reduce the hardware and to simplify the encoding. This (side) information, which is the information that identifies the choices, or selections, must is sent to the receiver. The number of possible selections (patterns, or vectors) is $64^4$. Defining this range of selections in binary form would require 128 bits of information, and that is still more bits than is desirable to use.

Consequently, a second level of simplification is introduced by arbitrarily electing to only employ a limited number of patterns with which to represent the superblock vector. That number may be, for example, 2048, which would require only 11 bits to encode. Variable length encoding might further reduce the amount. The 2048 selected patterns are stored in a vector codebook.

Viewing the task of choosing a codebook vector (i.e., quantization pattern) in somewhat more mathematical terms, for each transform coefficient that is quantized, a quantization error may be defined by $$q = |x - Q(x)| \tag{7}$$

where $Q(x)$ is the quantized value of the cell member $x$ (the value obtained by first encoding $x$ and then decoding $x$). For equal visibility of the errors throughout the image, it is desirable for this quantization error to be equal to some target distortion level, $d$, which is obtained from perceptual coder 49. It is expected, of course, that using the codebook vectors would not yield this target distortion level in all instances. Hence, we define a selection distortion error by $$e = |q - d|. \tag{8}$$

The total selection error for a cell is the sum of the individual selection errors of equation 9 over the 2×2 array of the cell members; and the overall selection errors for the superblock vector is the sum of the total selection errors of the 64 individual cells.

The process for selecting the appropriate codebook vector considers each of the codebook vectors and selects the codebook vector that offers the lowest overall selection error. In cases where two different codebook vectors offer the same or almost the same overall selection error, the vector that is selected is the one that results in fewer bits when the superblock is quantized.

Before proceeding to describe in detail the block diagram of QVS 38, it is convenient to first describe the element within QVS 38 that evaluates the selection error. That element is depicted in FIG. 9.

Figure 9:
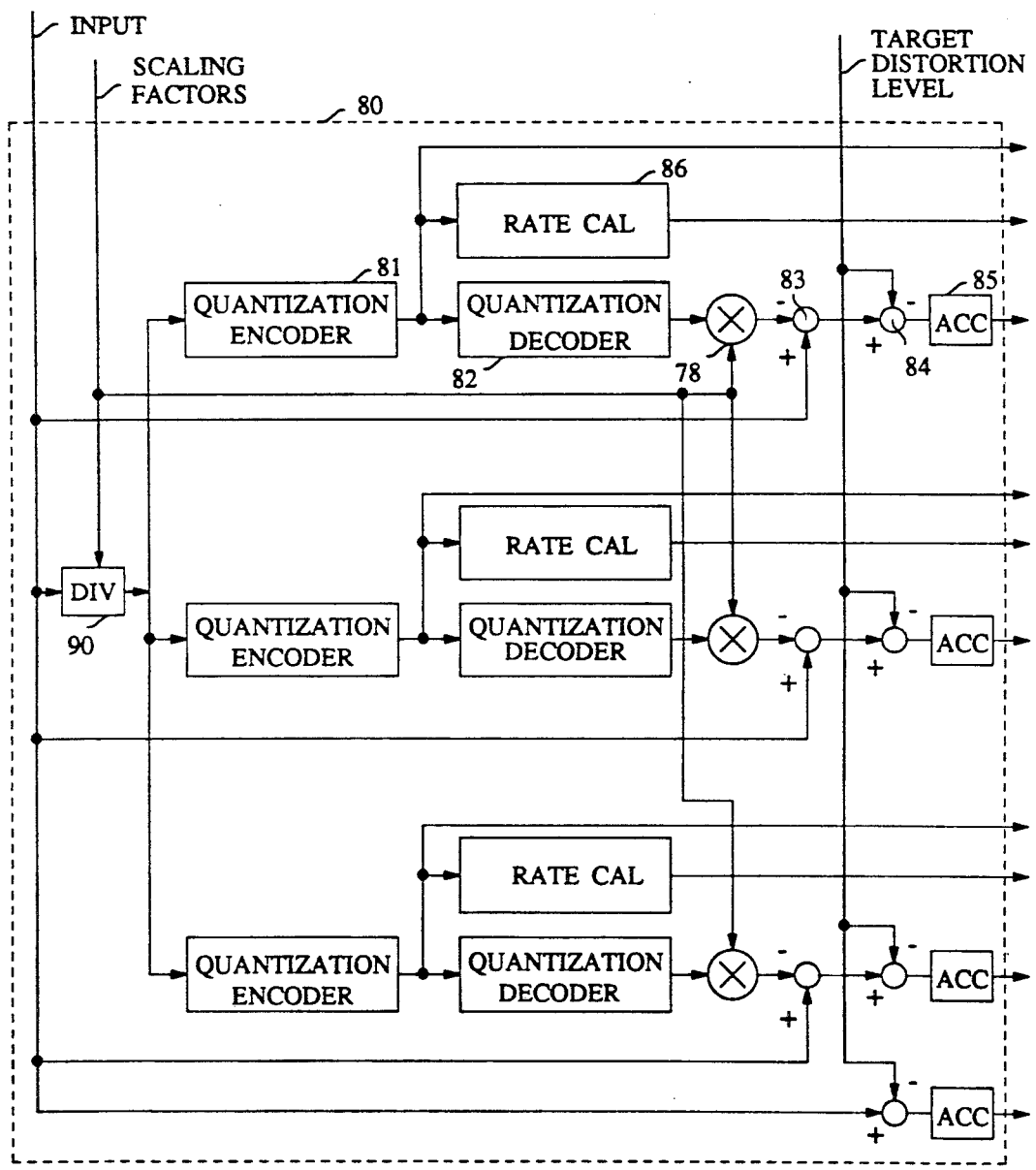
FIG. 9 depicts how a set of selection error signals is calculated in preparation for codebook vector selection.

FIG. 9 includes 3 parallel paths corresponding to each of the 3 nontrivial quantizers selected for the system ("drop the cell" is the fourth "quantizer", but it represents a trivial quantization schema). The paths are identical.

The scale factors derived in the forward estimation section of FIG. 1 are used to effectively match a set of standard quantizers to the data. This is done by first dividing the input signal in divider 90 by the scale factors. The scaled signals are then applied in each path to (quantizer) 81 and to subtracter 83. The quantized output data of encoder 81 is decoded in quantization decoder 82 and multiplied by the scale factors in multiplier 78. The result is the signal plus quantization noise. The quantization noise is isolated by subtracting the output of multiplier 78 from the original signal applied to divider 90. The subtraction is accomplished in subtracter 83. Of course, each of the encoder and decoder pairs in FIG. 9 employs a different quantizer.

The output of each subtracter 83 is the quantization error signal, $|q|$ for the employed level of quantization. The global target distortion level, $d$, is subtracted from $|q|$ in subtracter 84, and the results are added in accumulator 85. In accordance with equations 8 and 9, subtracter 83 and 84 are sign-magnitude subtracters that yield the magnitude of the difference. The output of each accumulator 85 provides the selection error for the cell received at the input of quantizer 81, based on the level of quantization of the associated quantizer 81.

The quantized signal of quantizer 81, which forms another output of the path, is also applied to rate calculator 86 which develops a measure of the number of bits that would be required to describe the signal of the incoming cell, if quantizer 81 were selected as the best quantizer to use. To summarize, each element 80 of FIG. 9 receives cell information and delivers a quantized signal, selection error signal and rate information for each of the possible quantization levels of the system.

The fourth path—which is not shown in FIG. 9—is the one that uses a "0 quantizer". It offers no quantized signal at all, a rate for this quantized signal that is 0, and an error signal that is equal to its input signal. The target distortion is subtracted from this and the absolute value accumulated as with the other quantizers.

Figure 10:
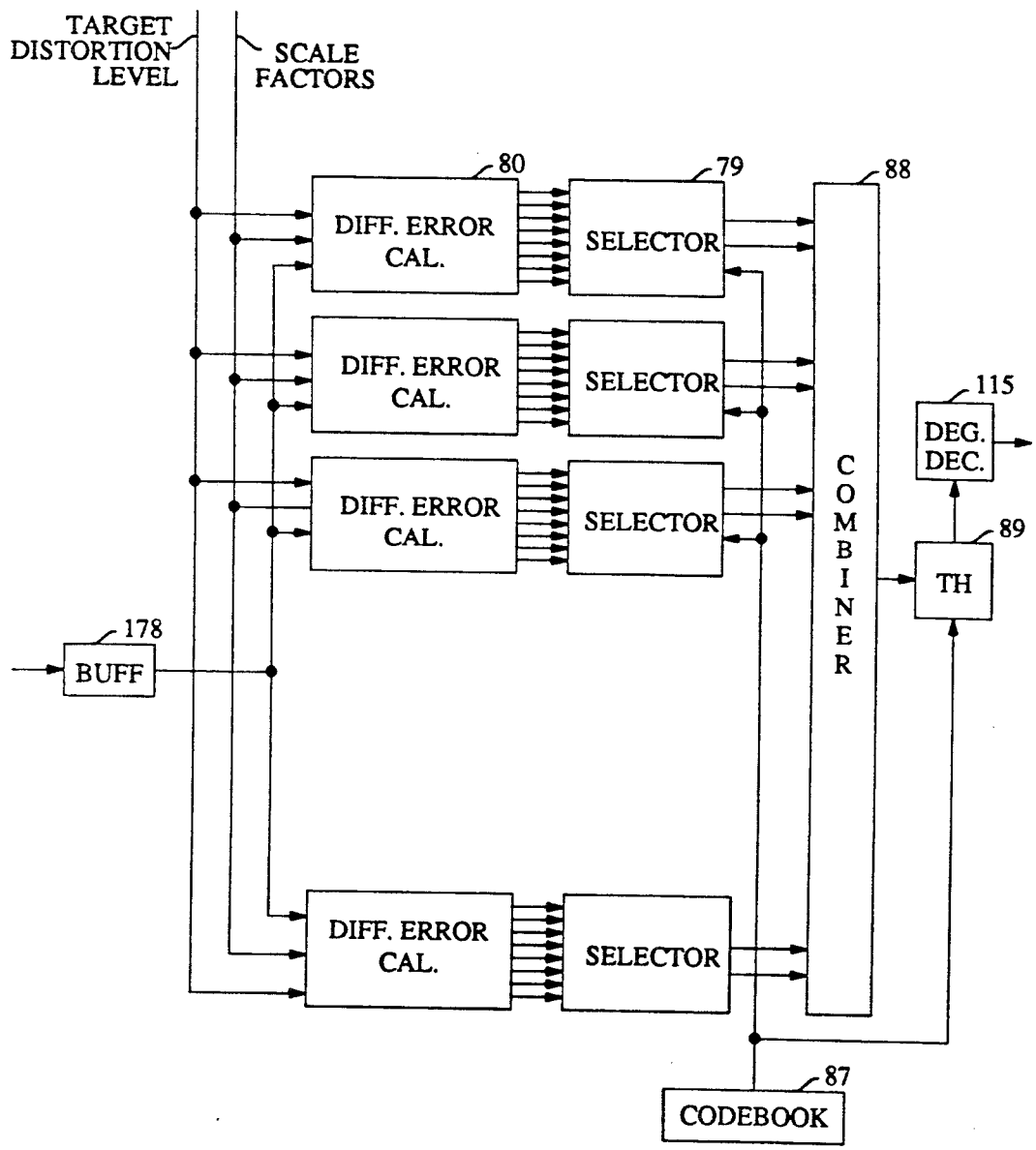
FIG. 10 presents a block diagram of QVS block 38.

FIG. 10 presents an embodiment of QVS 38. The input from DCT transfer element 37 (FIG. 2) is first applied to buffer 178 to create the superblock vectors (arrangement of cells as depicted at the right side of FIG. 8). The 64 cells of the superblock vector are each applied to a different one of the 64 blocks 80. As described in connection with FIG. 9, each block 80 develops a number of output triplets, with each triplet providing a quantized signal, a measure of the selection error of the cell in response to a given level of quantization, and the resulting number of bits for encoding the cell with that given level of quantization. The outputs of the 64 blocks 80 are each applied to 64 selector blocks 79.

The 64 selector blocks 79 are responsive to blocks 80 and also to codebook vector block 87. Block 87 contains the set of codebook vectors, which are the quantization selection patterns described above. In operation, block 87 cycles through its codebook vectors and delivers each of them, in parallel, to the 64 selector blocks. More particularly, each of the 64 elements of a vector codebook is fed to a different one of the 64 blocks 79. Under control of the applied codebook vector signals, each selection block 79 selects the appropriate one of the output triplets developed by its associated block 80 and applies the selected triplet to combiner circuit 88. The output of combiner circuit 88 is a sequence of quantized superblock signals, and the associated overall error and rate signals for the different codebook vectors that are sequentially delivered by codebook block 87. These overall triplet signals are applied to threshold circuit 89.

Threshold circuit 89 is also responsive to codebook block 87. It maintains information pertaining to the identity of codebook vector that produced the lowest overall selection error level, the number of bits that this codebook vector requires to quantize the superblock vector and, of course, the quantized superblock vector itself. As indicated previously, in cases where two codebook vectors yield very similar overall selection error levels, the vector that is selected is the one that requires a fewer number of bits to quantize the superblock vector.

The process of threshold circuit 89 can be easily carried out within two hardware sections. In the first section, a comparison is made between the current lowest overall selection error and the overall selection error that is applied to threshold circuit 89. The overall selection error that is higher is arbitrarily caused to assume some maximum rate. The setting to a maximum rate is disabled when the applied overall selection error is equal or almost equal to the current lowest overall selection error. In the second section, a comparison is made between rates, and the overall selection error with the lower rate is selected as the new current lowest overall selection error. After all of the codebook vectors are considered, threshold circuit 89 outputs the identity of one (optimum) codebook vector and its values for the superblock vector delivered by buffer 178. The process then repeats for the next superblock.

From threshold circuit 89 the codebook vector identification and the quantized values of the superblock vector cells are applied to degradation decision circuit 115. As mentioned earlier, in a digital HDTV system that aims to communicate via terrestrial transmission, it is important to provide for graceful degradation; particularly since existing analog TV transmission in effect offers such graceful degradation.

Graceful degradation is achieved by sorting the information developed and designating different information for different treatment. The number of different treatments that one may wish to have is a designer's choice. In the system as depicted in FIG. 2, that number is two (encoders 46 and 47). The criterion for differentiating may be related to spatial resolution, to temporal resolution. or, for example, to dynamic range.

With a strictly temporal resolution approach, for example, the task of block 115 may be quite simple. The idea may be to simply allow every odd frame to have all, or a large portion, of its information designated for superior treatment, and every even frame to have most, if not all, of its information designated for poorer treatment. In accordance with such an approach, degradation decision circuit 115 need only know whether the frame is even or odd and need be able to assign proportions. During odd frames most of the signals are routed to variable length encoder 47 for superior treatment, and during even frames most of the signals are routed to variable length encoder 46 for poorer treatment.

For a spatial resolution approach to different treatment, what is desired is to give preferential treatment to the low frequency components in the image over the high frequency components in the image. This can be easily accomplished in the system depicted in FIG. 2 in one of two ways. Experimentally it has been determined that the codebook vectors of block 87 form a collection of vectors that can be ordered by the number of higher frequency components that are included in the vector. Based on that, degradation decision circuit 115 need only know which codebook vector is being sent (that information is available from threshold circuit 89) and direct its input information to either encoder 47 or 46, accordingly. Alternatively, the low frequency cells of all the vectors may be designated for preferential treatment and sent to encoder 47.

It may be noted in passing that the above discussion regarding what information is sent to encoder 47 and what information is sent to encoder 46 relates to the quantized signals of the superblock vectors, and not to the identity of the codebook vectors themselves. At least where the low frequency coefficients of all of superblock the vectors are sent to encoder 47, the identity of the codebook vectors must all be sent to encoder 47.

VARIABLE LENGTH ENCODERS 46 AND 47

Variable length encoders 46 and 47 may be conventional encoders, such as Huffman encoders. The reason two are used is because the information directed to encoder 47 needs to be encoded in a manner that will guarantee a better chance of an error-free reception of the encoded signal. Therefore, the encoding within encoder 47 may be different from the encoding within encoder 46.

Of course, the encoding per se may not be deemed enough to enhance the chances of error-free reception of the signals encoded in encoder 47. Additional encoding, therefore, may be carried out in BFF block 56, or even beyond block 56.

INVERSE QUANTIZER 39

Figure 11:
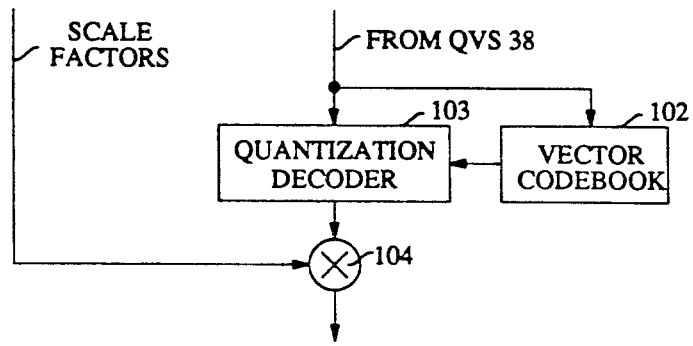
FIG. 11 is a block diagram of inverse quantization block 39.

Inverse quantizer 39 is responsive to the scale factors $S_{ji}$, but with respect to the quantized superblock signals, it is responsive only to that output of QVS 38 which is applied to variable length encoder 47. In other words, inverse quantizer 39 operates as if it has a very poor reception, with none of the signals from encoder 46 having reached it. A block diagram of block 39 is depicted in FIG. 11. As shown in FIG. 11, inverse quantizer 39 includes a vector codebook 102 that is identical to codebook 87 and a quantization decoder 103. With the direct aid of codebook 102, decoder 103 reverses the quantization effect of QVS 38. It is understood, of course, that the quantization noise introduced by the quantization encoder of QVS 38 cannot be reversed, but at least the general level of the initial signal is recovered. For example, say that the quantization steps within QVS 38 converted all levels from 0 to 8 to "0", all level between 8 and 16 to "1", all levels from 16 to 24 to "2", and all level from 24 to 32 to "3". For such an arrangement, inverse quantizer 39 may convert a "0" to 4, a "1" to 12, a "2" to 20 and a "3" to 28. An input of 22 would be quantized to "3" by QVS 38, and the quantized "3" would be inverse quantized in circuit 39 to 20. The quantization error level in this case would be 2.

Following the inverse quantization step within block 39, a correction step must be undertaken. Remembering that the input signals were scaled within QVS 38 prior to quantization, the opposite operation must be performed in block 39 and, accordingly, the output of decoder 103 is applied to multiplier 104 which is responsive to the scale factors $S_{ij}$. The output of multiplier 104 forms the output of inverse quantizer 39.

PERCEPTUAL CODER 49

Before proceeding to describe the details of perceptual coder 49, it should be pointed out that the choice of what functions are included in the forward estimation block of FIG. 1 or in BFF block 56 and what functions are included in the perceptual coder is somewhat arbitrary. As will be evident from the forward estimation below, some of the functions could easily be included in the forward estimation block or in BFF block 56.

The primary job of perceptual coder 49 is to assist QVS 38 to take an input image frame and represent it as well as possible using the number of bits allocated per frame. The process which produces the transformed displaced frame difference at the output of element 37 (FIG. 2) is designed to produce a representation which has less transform domain statistical redundancy. At that point, all of the information required to reconstruct the original input image still exits. It has only been transformed into representation that requires fewer bits to represent than the original. If there were enough bits available, it would be possible to produce a "coded" image that is bit for bit equivalent to the original.

Except for the most trivial of inputs, there are not enough bits available to represent that signal with that degree of fidelity. Therefore, the problem that must be solved is to produce a coded image that is as close to the original as possible, using the available bits, subject to the constraint that the output will be viewed by a human observer. That constraint is what perceptual coder 49 introduces via the target distortion signal that it sends to QVS 38. In other words, two constraints are imposed: 1) the result must be an essentially constant bit rate at the output of BFF 56, and 2) the error must be minimized, as perceived by a person.

One way of performing the bit assignment to assume a linear system and minimize the mean square error between the original image and coded image. This is the approach taken in many image coders. The problem with this approach is that the human visual system is not a linear system and it does not utilize a mean-square-error metric. The purpose of perceptual coder 49, therefore, is to provide perceptual thresholds for performing bit allocation based on the properties of the human visual system. Together, they form the target distortion level of FIGS. 9 and 10.

Perceptual thresholds provide a means of performing bit allocation so that the distortion present in the coded image appears, to a human observer, to be uniformly distributed. That is, though the use of perceptual thresholds the coded artifacts that are present will all have about the same visibility; and, if the bit rate of the system is reduced, the perceived quality of the coded image will generally drop without the creation of any obvious (i.e., localized) coding errors.

Figure 12:
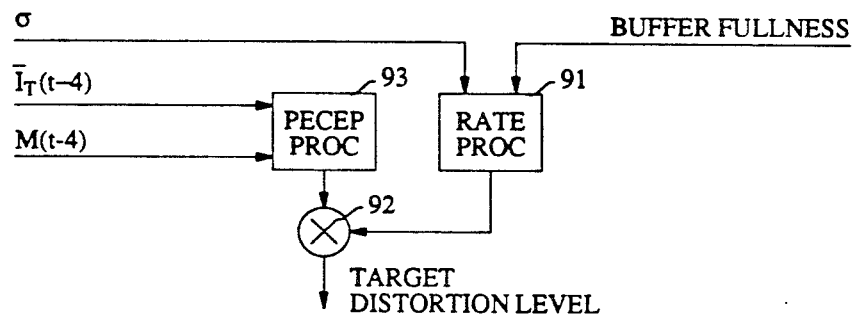
FIG. 12 presents the structure of perceptual coder 49.

FIG. 12 presents a block diagram of perceptual coder 49. It includes perceptual threshold generator 93 responsive to the $I_T(t-4)$ signal from the forward estimation block of FIG. 1, a rate processor 91 responsive to buffer fullness signal from the output buffer within BFF block 56, and a multiplier 92 for developing the target distortion signals in response to output signals of generator 93 and processor 91.

The output of the perceptual threshold generator 93 is a set of thresholds, one for each frequency domain element received by element 38 (FIG. 2), which give an estimate of the relative visibility of coding distortion at that spatial location and for that frequency band. As described in more detail below, these thresholds depend on the scene content of the original image and hence, the bit allocations adapt to variations in the input.

One image characteristic accounted for in generator 93 is frequency sensitivity. (In the context of this disclosure, we deal with transform domain coefficients, which are related to rapidity of changes in the image, and not with what is normally thought of as "frequency". In the next few paragraphs, however, it is believed helpful to describe what happens in terms of "frequency".) Frequency sensitivity exploits the fact that the visual systems modulation transfer function (MTF) is not flat. Relative visibility as a function of frequency starts at a reasonably good level, increases with frequency up to a peak as some frequency, and thereafter drops with frequency to below the relative visibility at low frequencies.

The MTF function means that more quantization error can be inserted at high frequencies than at low frequencies. Therefore, the perceptual thresholds for the high frequency subbands will be higher than those for the lower frequency subbands. The absolute frequency at which the peak visibility occurs depends on the size of the screen and the viewing distance. Approximately, however, the peak visibility occurs near the upper end of the second lowest frequency elements applied to QVS 38. Also, since the HVS is sensitive to low frequency flicker, the DC threshold is set to a value substantially less than that strictly required by the MTF.

Extending perceptual thresholds to textured input requires a definition of texture. "Texture" may be viewed as the amount of AC energy at a given location, weighted by the visibility of that energy. Actually, however, the HVS is very sensitive to distortion along edges, but much less sensitive to distortion across edges. This is accounted for by introducing the concept of directionality. Instead of computing a single texture estimate over all frequencies, separate estimates are made for horizontal, vertical, and diagonal components (RawHoriz, RawDiag and RawVert components) from which horizontal texture (HorizTex), diagonal texture (DiagTex) and vertical texture (VertTex) signals are developed in accordance with equations 10, 11 and 12.

$$\text{HorizTex} = \text{RawHoriz} + 0.50 \times \text{RawDiag} \tag{10}$$

$$\text{DiagTex} = 0.25 \times \text{RawHoriz} + \text{RawDiag} + 0.25 \times \text{RawVert} \tag{11}$$

$$\text{VerTex} = 0.5 \times \text{RawDiag} + \text{RawVert} \tag{12}$$

where $$\text{RawHoriz} = \sum_{\text{over } 8\times 8 \text{window}} MFT(0,j) \cdot T_T^2(0,j), \tag{13}$$

which is a summation only over the top row of the 8 × 8 window;

$$\text{RawVert} = \sum_{\text{over } 8\times 8 \text{window}} MFT(i,0) \cdot T_T^2(i,0), \tag{14}$$

which is a summation only over the left column of the 8 × 8 window; and $$\text{RawDiag} = \sum_{\substack{\text{over} \\ 8 \times 8 \text{window}}} MFT(i,j) \cdot \bar{I}_T^2(i,j),$$

where $i \neq 0$ and $j \neq 0$ which is a summation over the remaining frequency elements in the window. Actually, the summations may be restricted to the lowest frequency quadrant, since these coefficients contain over 90 percent of the energy in typical 8×8 windows.

The final component in generator 93 accounts for temporal masking. When, at a fixed location in the scene, there is a large change in image content between two frames, the HVS is less sensitive to high frequency details at that location in the current frame. By detecting the occurrence of large temporal differences, the perceptual thresholds at these locations can be increased for the current frame. This allows the bits that would have been allocated to the high frequency detail at these locations to be utilized for other portions of the image.

Figure 13:
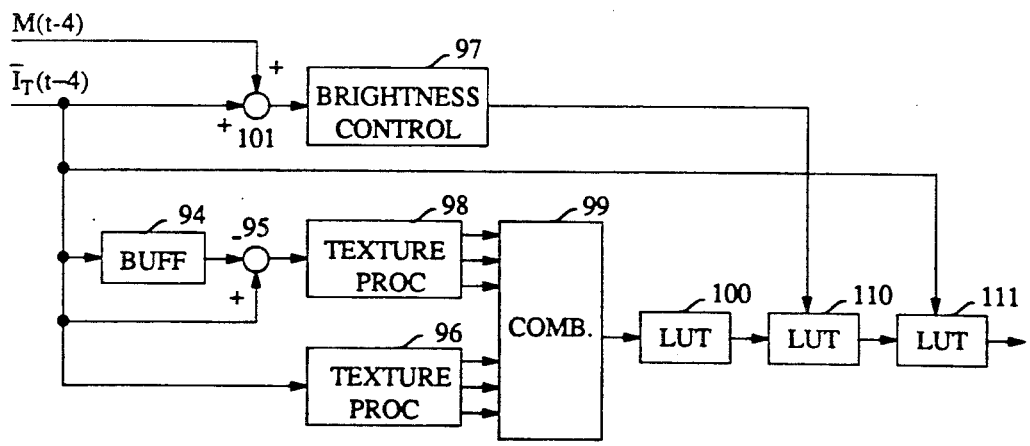
FIG. 13 illustrates the structure of perceptual processor 93.

In FIG. 13, the transformed image information (with the mean removed), $\bar{I}_T(t-4)$ is applied to adder 101, to buffer 94, to subtracter 95, to current texture processor 96, and to base threshold look-up table 111. Adder 101 combines the (0,0) coefficients of $\bar{I}_T(T-4)$ with its mean signal, M(t-4) to produce a local brightness estimate and sends the results to brightness correction truncation circuit 97. Thus, circuit 97 converts the (0,0) transform coefficients to local brightness correction control signals that are applied to brightness correction look-up table 110.

The other 63 subbands are split into two data streams. One goes to frame buffer 94 and to subtracter 95, where a temporal frame difference is developed. This difference is used to compute the temporal masking correction by applying the temporal frame difference to texture processor 98. The other path is applied to texture processor 96 directly. Texture processors 96 and 98 each implement equations 10 to 15.

Figure 14:
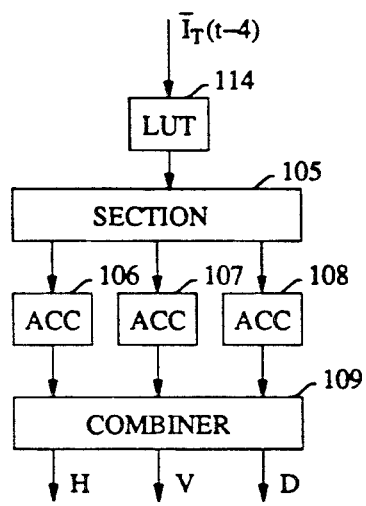
FIG. 14 is a block diagram of texture processors 96 and 98.

As depicted in FIG. 14, a texture processor comprises a look-up table (LUT) 114 which receives the image signals $\bar{I}_T(x,y)$ of frame t-4 and develops the factors $MTF(x,y) \cdot \bar{I}_T^2(i,j)$ of the frame for equations 13, 14, and 15. Selector 105 routes each factor to either RawHoriz accumulator 106, RawVert accumulator 107 or RawDiag accumulator 108. The developed raw texture estimates are appropriately added in combiner 109 according to equations 10, 11 and 12 to result in the projected directional texture estimates.

Continuing with FIG. 13, the two sets of projected directional texture estimates developed in processors 96 and 98 are passed though combiner 99 which develops a CombinedTexture signal in accordance with the following equation:

CombinedTexture = $T_0$·(Outputs of 96) + $T_1$(Outputs of 98). (16)

where $T_0$ and $T_1$ are fixed weighting constants; typically, 0.5. The combined texture estimates are applied to a Mapping LUT 100, which develops texture correction factors in accordance with:

TextureCorrection = $1 + K_1 \log(1 + K_2 \text{Combined-Texture})$ (17)

where K1 is a constant, typically between 0.5 and 2, and K2 is a constant typically between 1/1000 and 1/10000. This LUT converts the directional power domain texture estimates to amplitude domain threshold corrections.

The output of LUT 100 is applied to brightness correction look-up table 110, which is also responsive to brightness correction signal of block 97. This table multiplies the amplitude domain texture threshold corrections by the appropriate brightness correction factor. The output of look-up table 110 is finally applied to base threshold look-up table 111, which modulates the image signal with the output of table 110 and thereby develops a perceptual threshold for each frequency element of each block of the frame signal $\bar{I}_T(t-4)$. The base threshold LUT takes the appropriate directional texture/brightness correction factor and applies a frequency dependent base threshold. That is, it develops signals $PT_{ij}(t-4)$, which are the 64 signals for each frame, one for each of the frequency coefficients supplied by DCT circuit 37 to QVS 38.

As stated above, one of the goals of perceptual coder 49 is to insure that the rate of bits delivered by QVS 38 (through BFF 56) to subsequent circuitry is essentially constant. This is accomplished by making sure that the fullness of the buffer within BFF 56 is controlled properly.

The buffer control within the encoder of FIG. 2 is based upon modifying a frame-wide target distortion within QVS 38. If the buffer fills up to a point higher than some reference level, a larger target distortion is set to allow the buffer to lower its occupancy level. On the other hand, if the buffer fullness is lower than the reference level, then a lower target distortion is set.

Given a certain buffer fullness $B_t$ the desired buffer fullness for the next frame can be formulated as $$B_{p+1} = B_{ref} + (B_p - B_{ref}) \times k_0, \quad (13)$$

where $B_{ref}$ is the desired level of buffer fullness, $B_p$ is the buffer fullness at frame p, and $k_0$ is a buffer control parameter which is constant, $$0 < k_0 < 1. \quad (14)$$

But, $$B_{p+1} = B_p + R_{p+1} - R_{CH}, \quad (15)$$

where $R_{p+1}$ is the number of bits coming into the buffer at frame p+1, and $R_{CH}$ is the number of bits (channel capacity) that leave the buffer with each frame.

We have determined experimentally that one good target rate for a chosen distortion level D, $R_T(D)$, can be calculated (using the t-4 frame reference in FIG. 2) and where T stands for "target", in accordance with equation 16.

$$R_T(D_T) = a + b \log\left(\frac{D_T}{\sigma_{t-4}}\right) \quad (16)$$

where the standard deviation $\sigma$ is computed in processor 53 (FIG. 1) and parameters a and b are computed from the two previous frames by $$b = \min\left(b_{max}, \frac{R_{t-5} - R_{t-6}}{\log\left(\frac{D_{t-5}}{\sigma_{t-5}}\right) - \log\left(\frac{D_{t-6}}{\sigma_{t-6}}\right)}\right) \quad (17)$$

and $$a = R_{t-5} - b \cdot \log\left(\frac{D_{t-5}}{\sigma_{t-5}}\right). \quad (18)$$

The minimization operation in equation 17 is included merely to avoid instabilities for small values of the denominator. Using equations 16, 17 and 18, the target distortion is $$D_T = \sigma_{t-4} e^{\frac{(R_T - a)}{b}}. \quad (19)$$

Replacing the rate, $R_T$ in equation 19 with the buffer fullness measures (with the aid of equation 15), yields $$D_T = \sigma_{t-4}\left(\frac{D_{t-5}}{\sigma_{t-5}}\right) e^{\frac{\{(B_{t-5} - B_{ref}) \cdot k_0 + (B_{t-5} - B_{t-6})\}}{-b}} \quad (20)$$

The computation of equation 20 is performed in processor 91. It requires the constant $k_o$, the constant $B_{ref}$, the current frame's $\sigma$ value ($\sigma_{t-4}$), the previous frame's D value, $\sigma$ value and B value (D(t-5), $\sigma$(t-5), and B(t-5)), and the B value before that (i.e., B(t-6)). The sigma values come from processor 53 (FIG. 1) and the B values come from BFF block 56. Of course, the various delayed images of B and $\sigma$ are obtained with appropriate registers within processor 91. The exponentiation and other computations that are called for by equation 20 can be either computed or derived from a look-up table.

The D value developed by processor 91 is applied to multiplier 92 to alter the perceptual thresholds developed in block 93. The altered perceptual threshold signals are applied, as described above, to selectors 79 in FIG. 10.

BUFFER FULLNESS AND FORMATTER 56

As indicated above, buffer fullness circuit 56 needs to supply perceptual coder 49 with the information on buffer fullness. Of course, that implies that block 56 includes a buffer which is filled. That indeed is the case. BFF block 56 accumulates the various segments of data that must be transmitted and forwards that data to modulation circuitry, power amplification circuitry, and the transmitting antenna.

To recap block 56 accepts the following signals:
1. The coded motion vectors CODED MV(t-4). These are a collection of Hoffman coded packets, where each packet describes the motion vectors of a slice, as described in detail in connection with FIGS. 5 and 6.
2. Leak factor signals L(t-4).
3. Scaling factors $S_{ij}$.
4. Coded information from encoder 47, which is the identity of the codebook vectors selected from codebook 87, and the quantized superblock vectors.
5. Coded information from encoder 46 (much like information from encoder 47).

As indicated above, the encoded information of encoder 47 is considered more important than the encoded information of encoder 46 and accordingly, only after the encoded information of encoder 47 is accepted and there is room left in the buffer of block 56, will the information of encoder 46 be considered for inclusion. However, even with respect to the information of encoder 47, the buffer of block 56 is filled with the more important information first. Buffer underflow in BFF 56 is handled by delivering dummy data to the following circuitry, in order to maintain a constant bit rate into the channel. This highly unlikely event is easily handled by simply retransmitting the data at the buffer's 0 address.

Buffer overflow is handled by simply not transmitting data that doesn't fit into the buffer, in which case it is advisable to drop the least significant data first. By "drop" we mean not transmit some of the data that is in the buffer and empty the buffer for the next frame's data, and not load the buffer with new data that is of low importance. Of course, the buffer fullness measurement in combination with the perceptual thresholds are combined in perceptual block 49 to form a global target distortion level that will allow the output buffer of block 56 to be populated with all of the data that is generated; including the data of encoder 46. The primary consequence of the encoding within encoder is to allow more sophisticated encoding in the data of encoder 47 which, in turn, enhances the receivability of those signals.

The information received from sources other than encoder 46 need to be transmitted in a manner that is likely to be received correctly. That means that the formatter section of block 56 must encode the information is a manner that will ensure that. This can be accomplished with conventional coder means that incorporates error correcting codes. The signals derived from other than encoder 46 are encoded with powerful error correcting codes, while the signals received from encoder 46 are encoded with less powerful error correcting codes (or perhaps no error correcting codes.

In a copending application, Ser. No. 07/611,225 a system is disclosed for encoding signals using the concepts of code constellations. Code constellations can be formed with some codes in the constellations having a large Hamming distance from all other codes, while other codes in the constellations have a smaller Hamming distance from other codes. The principles of such coding can be advantageously incorporated within the formatter section of block 56, or in circuitry beyond block 56 to achieve the goals of graceful degradation.

HDTV RECEIVER'S DECODER

Figure 15:
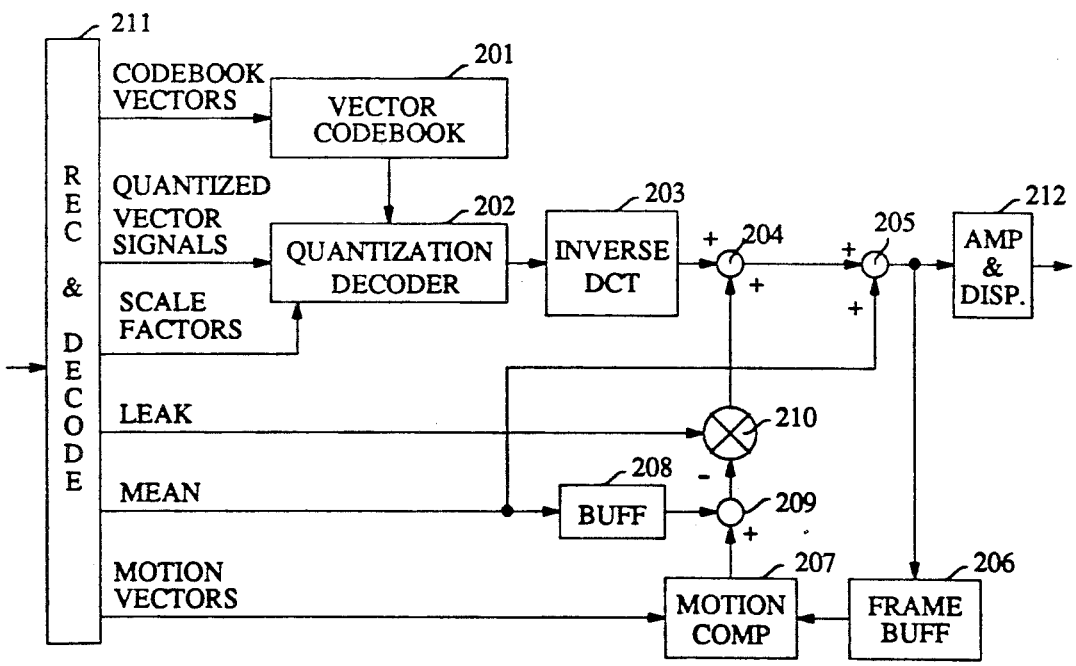
FIG. 15 presents a block diagram of a digital HDTV receiver.

FIG. 15 present's a block diagram of an HDTV receiver that conforms to the HDTV transmitter encoder described above. It receives the signal, e.g., from an antenna, and decodes i in block 211 to yield the signals loaded into BFF block 56 within the transmitter. These signals are the codebook vector identifiers, the quantized superblock vector signals, the leak factors, the scaling factors, the frame means, and the motion vectors. The receptions of these signals, their separation from the combined received signal, the error code verifications, and the decoding of the variable length codes are all performed in block 211.

The processing in the decoder begins with the codebook vector identifiers applied to a codebook vector 201, and the quantized vector signals and the scale factors applied to quantization decoder 202. Blocks 201 and 202 correspond to blocks 102 and 103, respectively, of FIG. 11, and together they form an inverse quantization element akin to element 39 of FIG. 2. As in FIG. 2, the output of the inverse quantization element is applied to an inverse DCT transform circuit (in FIG. 15, this is circuit 203); and that output is combined in adder 204 with signals already stored in the decoder.

Since the quantized vector signals of a frame were created from image signals with the frame mean deleted, the output of adder 204 is missing the frame mean. This is remedied in adder 205, which adds the frame mean. The output signals of adder 205 form the frame output of the HDTV receiver's decoder. This output is applied to amplifier-and-display circuit 212 and to frame buffer circuit 206, where one frame's worth of information is stored. For each frame that is stored in buffer circuit 206, buffer circuit 206 outputs the previous frame. The previous frame signal is augmented in motion compensation block 207 which, in response to the applied motion signals, forms an estimate of the current frame. Motion compensation block 207 is identical to motion compensation block 43 in FIG. 2. The frame mean is substracted from the output of motion compensation block 207 by substracting therefrom the previous frame's mean in substracter 209. The previous frame's mean is obtained from buffer 208, into which the current frame's mean is inserted. Finally, the output of subtracter 209 is applied to multiplier 210, which multiplies that signal by the leak factor signal. The output of multiplier 210 is the signal that is employed in adder 204 as described above.

We claim:

1. An encoder including a coder for developing encoder output signals from frame difference signals, prediction means responsive to said encoder output signals for predicting a next frame's signals, and means for developing said frame difference signals from applied next frame signals of an image frame and from output signals of said prediction means, the improvement comprising:
said coder including controllable quantizer means that quantizes said difference signals in accordance with a quantization schema that varies with the dictates of a control signal; and
said coder including means, responsive to said applied next frame signals, to develop said control signal, which control signal varies throughout said applied next frame with changes in at least one selected characteristic of said applied next frame signals.

2. The encoder of claim 1 wherein said control signal is further responsive to a selected bit rate target level for said encoder output signals.

3. The encoder of claim 2 wherein said control signal forms a selected quantization error target level for said encoder output signals.

4. The encoder of claim 1 wherein said selected characteristic is a measure of texture in said applied next frame signals.

5. The encoder of claim 4 wherein said measure of texture is a combination of texture measured horizontally, texture measured vertically, and texture measured over a selected area of said image frame.

6. The encoder of claim 4 wherein said measure of texture is a combination of a texture measure of said applied next frame signals and of previously applied next frame signals.

7. The encoder of claim 1 wherein said selected characteristic is a measure of brightness in said applied nex frame signals.

8. The encoder of claim 1 further comprising an output buffer for receiving said encoder output signals, and said coder comprising means for receiving signals from said output buffer that indicate the level of buffer fullness of said output buffer.

9. The encoder of claim 8 wherein selected characteristic is a measure of buffer fullness of said output buffer.

10. The encoder of claim 8 wherein selected characteristic is a combination of said buffer fullness of said output buffer, brightness of said applied next frame signals and texture of said applied next frame signals.

11. The encoder of claim 8 wherein said characteristic is related to the buffer fullness of said output buffer in the previous frame.

12. The encoder of claim 8 wherein said characteristic is related to the buffer fullness of said output buffer in the previous frame and in the frame previous to the previous frame.

13. The encoder of claim 1 wherein said coder is responsive to applied scale factor signals to control the effective range of said quantizer means.

14. The encoder of claim 1 further comprising:
forward estimation means including means for processing said next frame signals to develop said control signal within a processing interval; and
means for delaying said next frame signals by said processing interval.

15. The encoder of claim 14 wherein said forward estimation means further includes means for developing said measure of brightness within said processing interval.

16. The encoder of claim 14 wherein said forward estimation means further includes means for developing said measure of texture within said processing interval.

17. The encoder of claim 1 wherein said next frame signals comprise a sequence of signal sections, each of which is related to a transform of at least one block of said frame difference signals, and each of which including a collection of N transform element signals, and said control signal comprising N control signal cells, where N in a constant, and each control signal cell controls the quantization schema for a different one of said N transform element signals.

18. The encoder of claim 17 wherein said control signal having N control signal cells is a control signal vector that is selected from a look-up table that contains a collection of control signal vectors.

19. The encoder of claim 18 wherein the selection from said look-up table is based on an error level that is obtained by coding said frame difference signal under control of each vector and said selected characteristic, and by developing a quantization error signal that is subtracted from a quantization error target level.

20. The encoder of claim 19 wherein said selected characteristic is scale factors that are related to the power at various subbands in said next frame's signals.

21. The encoder of claim 19 wherein said quantization error target level is related to signal characteristics of said next frame's signals.

22. The encoder of claim 19 wherein said quantization error target level is further related to buffer fullness of a buffer that stores said encoder output signals.

23. The encoder of claim 19 wherein said selection is further based on the number of bits created by said coder quantizer means.

24. The encoder of claim 18 wherein the selection from said look-up table is based on an error level that is obtained by scaling said frame difference signal, coding the scaled frame difference signal under control of each vector and said selected characteristic and by developing a quantization error signal that is subtracted in an absolute sense from a quantization error target level.

25. The encoder of claim 24 wherein said selected characteristic is related to texture of said next frame signal.

26. An encoder comprising:
prediction means responsive to output signals of said encoder, for developing frame prediction signals;
means for developing frame difference signals in response to said frame prediction means and applied frame signals;
coder means, responsive to said frame difference signals and to a control signal, for encoding frame difference signals under direction of said control signal, where said coder means codes different portions of said frame difference signals with different coding schemas, where different coding schemas yield different numbers of bits when coding any given signal, said coder means thereby generates a number of bits when encoding said applied frame signals; and
control means for developing said control signal in response to said encoder output signals, to control the number of bits generated by said coder means while encoding said applied frame signals.

27. The encoder of claim 26 wherein said control means develops a control signal that controls said coder means to develop a number of bits for each frame of said applied frame signals that approaches a preselect number.

28. The encoder of claim 26 wherein said control means develops a control signal that controls said coder means to develop a number of bits for each frame of said applied frame signals that on average approaches a preselect number.

29. The encoder of claim 26 where said control means is further responsive to said applied frame signals and modifies its developed control signal based on said applied frame signals to control coding error signals created in said coder in the course of coding of said frame difference signals.

30. The encoder of claim 27 where said control means modifies said control signal in response to said applied frame signal to equalize coding error signals throughout a frame of said applied frame signals.

31. The encoder of claim 27 where said control means develops said control signal in accordance with a visual perception model for humans, to cause the creation of encoder outputs signals that, when said encoder output signals are decoded and a frame image is created and displayed, the coding error signals found in said created and displayed frame image are perceived, in accordance with said visual perception model, to be essentially equally visible throughout said frame.

* * * * *